United States Patent
Tanaka et al.

(10) Patent No.: US 8,386,141 B2
(45) Date of Patent: Feb. 26, 2013

(54) VEHICLE CONTROL SYSTEM

(75) Inventors: Koutarou Tanaka, Kariya (JP); Haruki Matsuzaki, Anjo (JP); Atsushi Kashiwazaki, Anjo (JP)

(73) Assignee: Denso Corporation, Kariya (JP)

( * ) Notice: Subject to any disclaimer, the term of this patent is extended or adjusted under 35 U.S.C. 154(b) by 1076 days.

(21) Appl. No.: 12/342,290

(22) Filed: Dec. 23, 2008

(65) Prior Publication Data

US 2009/0171544 A1  Jul. 2, 2009

(30) Foreign Application Priority Data

Dec. 27, 2007 (JP) ................................ 2007-335907

(51) Int. Cl.
*F16H 59/08* (2006.01)
*F16H 61/12* (2010.01)

(52) U.S. Cl. ............ 701/62; 701/51; 701/52; 701/29.2; 180/336

(58) Field of Classification Search .............. 701/51, 701/52, 55, 58, 62, 63, 29.2, 33.7, 34.4; 74/335, 74/473.3, 473.31, 473.18; 180/336
See application file for complete search history.

(56) References Cited

U.S. PATENT DOCUMENTS

| | | | |
|---|---|---|---|
| 6,382,041 B1 | 5/2002 | Burgbacher et al. | |
| 6,532,841 B2* | 3/2003 | Medico et al. | 74/335 |
| 6,699,155 B2* | 3/2004 | Nagasaka | 477/94 |
| 2002/0046621 A1* | 4/2002 | Medico et al. | 74/523 |
| 2002/0152827 A1* | 10/2002 | Hayashi et al. | 74/473.3 |
| 2006/0015234 A1* | 1/2006 | Luh | 701/51 |
| 2007/0203643 A1* | 8/2007 | Ramaswamy et al. | 701/211 |

FOREIGN PATENT DOCUMENTS

| | | |
|---|---|---|
| DE | 10 2006 010 909 | 9/2007 |
| DE | 102006010909 A1 * | 9/2007 |
| EP | 1 146 257 | 10/2001 |
| JP | 5-43904 | 7/1993 |
| JP | 5-203042 | 8/1993 |
| JP | 07-052676 | 2/1995 |
| JP | 10-184893 | 7/1998 |
| JP | 2000-242888 | 9/2000 |
| JP | 2001-153215 | 6/2001 |
| JP | 2001153215 A * | 6/2001 |
| JP | 2003-240116 | 8/2003 |
| JP | 2003240116 A * | 8/2003 |
| JP | 2004-353827 | 12/2004 |
| JP | 2006-335157 | 12/2006 |

OTHER PUBLICATIONS

Extended European Search Report dated Feb. 22, 2011, issued in corresponding European Application No. 08020259.1-2421.
Japanese Office Action dated Aug. 25, 2009, issued in corresponding Japanese Application No. 2007-335907, with English translation.

* cited by examiner

*Primary Examiner* — Khoi Tran
*Assistant Examiner* — Spencer Patton
(74) *Attorney, Agent, or Firm* — Nixon & Vanderhye P.C.

(57) ABSTRACT

A vehicle control system for an automatic transmission includes a range selector for outputting a range instruction signal representing the selected shift range and a range shifter for manually outputting a shift instruction signal, and a by-wire control part for controlling the change-over of the shift range according to the range instruction signal input from the range selector. The by-wire control part has a range control circuit, which uses the shift instruction signal input from the range shifter if the range instruction signal is abnormal while monitoring the range instruction signal input from the range selector.

11 Claims, 14 Drawing Sheets

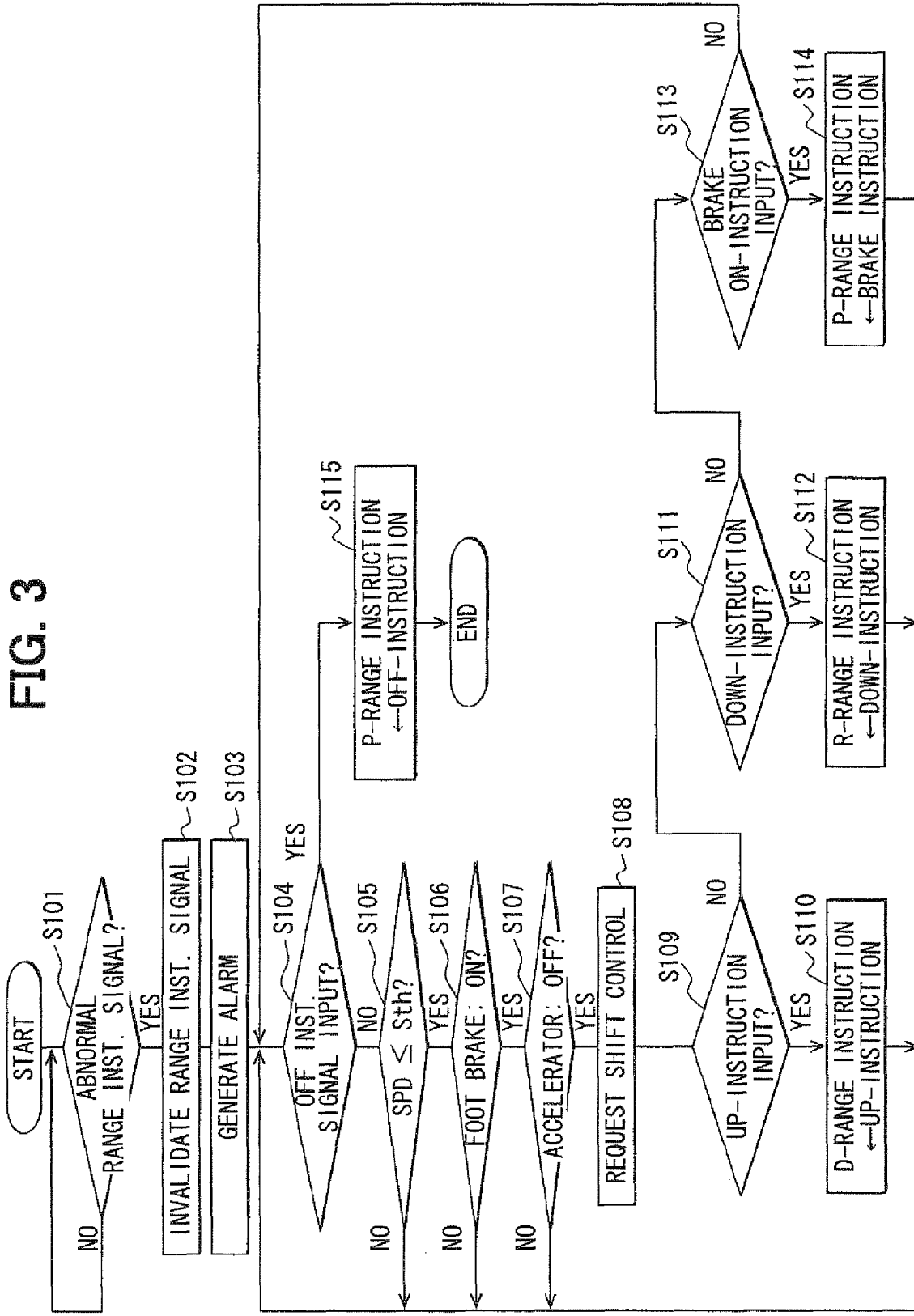

VEHICLE CONTROL SYSTEM

CROSS REFERENCE TO RELATED APPLICATION

This application relates to and incorporates herein by reference Japanese Patent Application No. 2007-335907 filed on Dec. 27, 2007.

FIELD OF THE INVENTION

This invention relates to a vehicle control system for controlling an automatic transmission of a vehicle.

BACKGROUND OF THE INVENTION

A conventional vehicle control system changes over a shift range of an automatic transmission of a vehicle through by-wire control in response to an output signal from an operation unit operated by a vehicle driver. The output signal instructs the shift range to the automatic transmission of the vehicle. In the vehicle control system of this type, however, it is probable that abnormal signals are input to a by-wire control part from the operation unit due to defective operation of the operation unit or defective communication between the operation unit and the by-wire control part. Such abnormal signals will cause an unnecessary change over to a shift range different from the one instructed by the driver or make it difficult to change over the shift range as instructed.

JP-B-5-43904 proposes enhancing fail-safe performance by using an emergency switch attached to an operation unit in case the operation unit becomes defective.

However, this emergency switch is operated only in case a trouble has occurred. This is additionally incorporated in the operation unit and raises the cost. Besides although this technology can cope with the trouble in the operation unit but cannot cope with the defective communication between the operation unit and the by-wire control part, and is not still satisfactory from the standpoint of fail-safe performance. Addition of a function for dealing with the defective communication further raises the cost.

SUMMARY OF THE INVENTION

It is therefore an object of the present invention to provide a vehicle control system for improving fail-safe performance and cost performance.

According to one aspect, a vehicle control system for an automatic transmission of a vehicle comprises a first operation part, a second operation part and a by-wire control part. The first operation part is operable for issuing an instruction for shifting a range of an automatic transmission of a vehicle, and outputting a first instruction signal representing an instruction for shifting the range. The second operation part is operable separately from the first operation part for issuing an instruction concerning an additional function added to essential functions that are essential for driving the vehicle, and outputting a second instruction signal representing an instruction related to the additional function. The by-wire control part controls the change-over of the shift range according to a reference signal which is the first instruction signal input from the first operation part. The by-wire control part monitors the first instruction signal input from the first operation part, and uses the second instruction signal input from the second operation unit as the reference signal if the first instruction signal is determined to be abnormal.

BRIEF DESCRIPTION OF THE DRAWINGS

The above and other objects, features and advantages of the present invention will become more apparent from the following detailed description made with reference to the accompanying drawings: In the drawings:

FIG. 3 is a flowchart illustrating fail-safe control in the first embodiment of the invention;

DETAILED DESCRIPTION OF THE PREFERRED EMBODIMENTS

Figure 1:
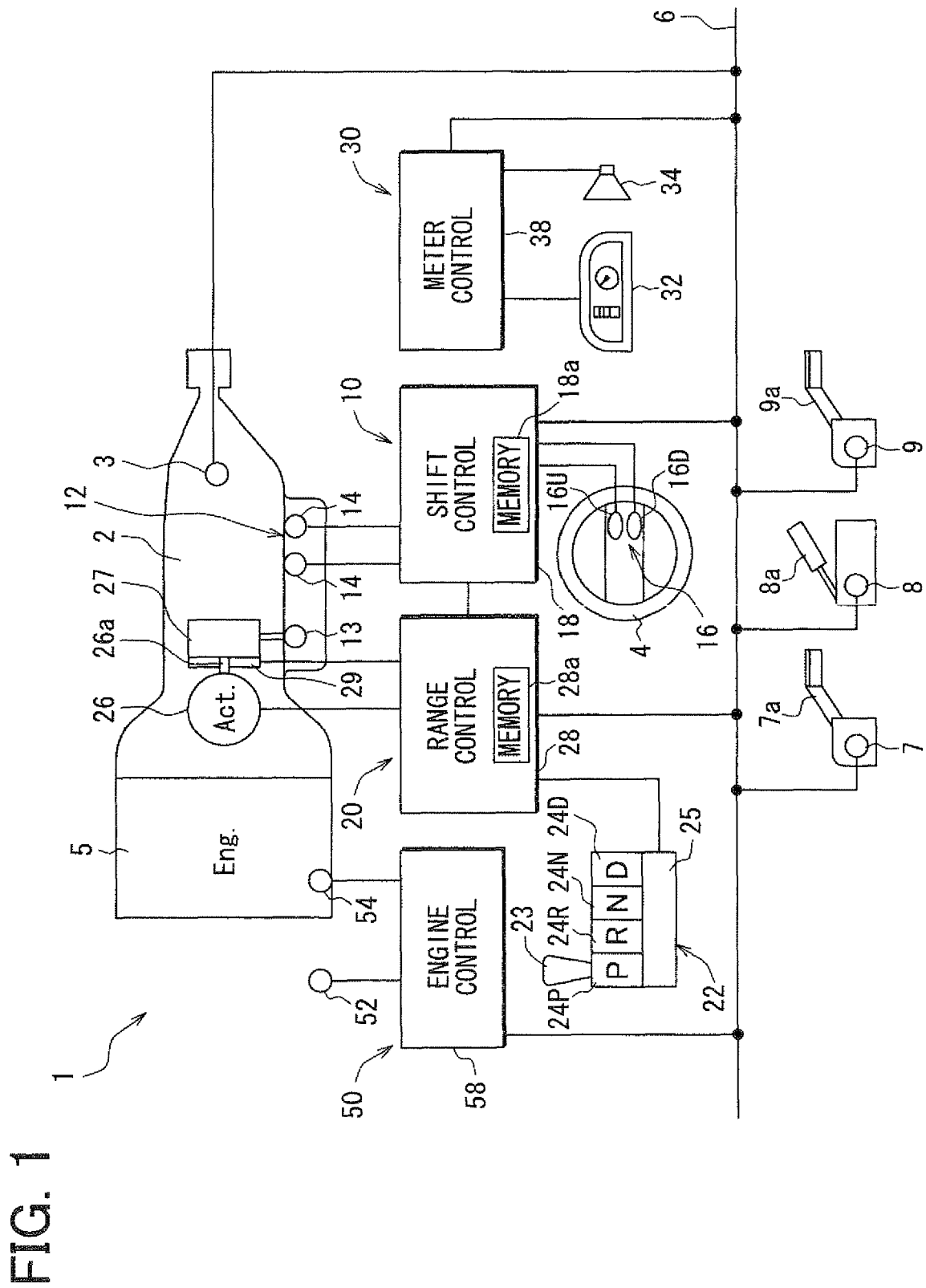
FIG. 1 is a schematic diagram illustrating a vehicle control system according to a first embodiment of the invention.

Embodiments of the invention will now be described with reference to various embodiments. In the embodiments, the corresponding constructional parts are denoted by the same reference numerals for brevity.

First Embodiment

Referring to FIG. 1, a vehicle control system 1 is mounted on a vehicle (not shown) together with an engine 5 and an automatic transmission 2. The vehicle control system 1 is provided with a shift control device 10, a range control device 20, a meter device 30 and an engine control device 50.

The engine control device 50 includes an engine switch 52, engine sensors 54 and an engine control circuit 58. The engine switch 52 is an ignition switch for instructing the on/off of the engine 5, and provided in front of a driver's seat in the vehicle. This engine switch 52 is manually operable by the driver or can be remotely operated by using an electronic key. The engine switch 52 outputs an on-signal when it is turned on and outputs an off-signal when it is turned off. Therefore, depending on its operation, the engine switch 52 outputs a switch instruction signal representing an on instruction or an off instruction for the engine 5.

The engine sensors 54 detect the operating conditions of the engine 5 based on the opening degree of an intake throttle, and operation timings of fuel injectors and an igniter.

The engine control circuit 58 is an electronic circuit including a microcomputer, and is directly connected to the engine switch 52 and to the engine sensors 54 to communicate therewith. Upon receipt of a switch instruction signal representing the on-instruction from the engine switch 52, the engine control circuit 58 starts the engine 5 and, thereafter, controls the engine 5 based on the input signals from the engine sensors 54. Upon receipt of a switch instruction signal representing the off-instruction from the engine switch 52, on the other hand, the engine control circuit 58 stops the engine 5 and stands ready for the next start.

The shift control device 10 includes a hydraulic circuit 12, a range shifter 16 and a shift control circuit 18.

The hydraulic circuit 12 is constructed with a manual valve 13 and a plurality of electromagnetic valves 14. The manual valve 13 is a spool valve and works to change over the shift range of the automatic transmission 2 based on the output hydraulic pressure that varies depending on the moving position of the spool (not shown) that reciprocally moves. Here, the automatic transmission 2 provides two kinds of traveling ranges, i.e., a forward drive range (D) and a reverse drive range (R) as shift ranges for transmitting the rotational output of the engine 5 to the drive wheels of the vehicle. The automatic transmission 2, further, provides two kinds of non-traveling ranges, i.e., a parking range (P) and a neutral range (N) as shift ranges for not transmitting the rotational output of the engine 5 to the drive wheels of the vehicle.

The electromagnetic valves 14 drive the corresponding shift moving elements (not shown) in the automatic transmission 2 depending on the hydraulic output. Here, the automatic transmission 2 is a stepped shift system, in which friction elements such as clutches and brakes which are shift moving elements are tightened or released by the corresponding electromagnetic valves 14, so that the transmission gear ratio in the D-range changes over stepwise.

The range shifter 16 is constructed by a shift-up switch 16U for instructing the automatic transmission 2 to change the transmission gear ratio up and a shift-down switch 16D for instructing the automatic transmission 2 to change the transmission gear ratio down. The shift switches 16U and 16D are button switches as illustrated in FIG. 1 or arm switches that are provided on a steering wheel 4 in front of the driver's seat in the vehicle and independently and manually operable by the driver, and produces on-signals when turned on and produces off-signals in other cases. When operated, therefore, the shift switches 16U and 16D output the shift instruction signals representing an up-instruction or a down-instruction concerning the transmission gear ratio.

The shift control circuit 18 is an electronic circuit including a microcomputer and has a memory 18a. The shift control circuit 18 is directly connected to the electromagnetic valves 14 of the hydraulic circuit 12 and to the shift switches 16U and 16D so as to be communicable therewith, and is connected to the engine control circuit 58 and to a vehicle speed sensor 3 through an in-vehicle LAN 6 to be communicable therewith. Here, the vehicle speed sensor 3 detects the speed of the vehicle based on the rotational speed of a transmission shaft of the automatic transmission 2.

The shift control circuit 18 selectively realizes an automatic shift mode for automatically changing over the transmission gear ratio of the automatic transmission 2 as a function essential for the vehicle and a manual shift mode for manually changing over the transmission gear ratio of the automatic transmission 2 as an additional function of the vehicle added to the essential function. Here, in the automatic shift mode, the transmission gear ratio of the automatic transmission 2 is so changed over as to comply with a shift map stored in the memory 18a based on the engine operating condition represented by an input signal from the engine sensors 54 through the engine control circuit 58 and upon a vehicle speed represented by an input signal from the vehicle speed sensor 3. In the manual shift mode, on the other hand, the transmission gear ratio of the automatic transmission 2 is changed over depending on the up-instruction or the down-instruction represented by the shift instruction signal input from the shift switch 16U or 16D. The shift mode is selected by operating a predetermined operation member provided near the driver's seat in the vehicle.

The range control device 20 includes a range selector 22, a shift actuator 26, a motion conversion mechanism 27, a rotational position sensor 29 and a range control circuit 28.

The range selector 22 is constructed by a selector lever 23, range switches 24P, 24R, 24N, 24D, and a range output device 25. The selector lever 23 is provided in front of or by the side of the driver's seat in the vehicle, and is manually operable by the driver to select a shift range. Four shift positions P, R, N and D corresponding to the P-, R-, N- and D-shift ranges are set for the selector lever 23 as operation positions for instructing a shift range for the automatic transmission 2. The range switches 24P, 24R, 24N and 24D are contact switches or non-contact switches provided near the selector lever 23, and output an on-signal upon detecting the selector lever 23 operated to the shift position P, R, N or D, and output an off-signal in other cases.

The range output device 25 is directly connected to the range switches 24P, 24R, 24N and 24D so as to be communicable therewith. Based on the signals input from the range switches 24P, 24R, 24N and 24D, the range output device 25 so forms an output signal as to identify the present shift position of the selector lever 23 among the shift positions P, R, N and D depending on the duty ratio. Therefore, the range output device 25 outputs a range instruction signal representing a selected range (instructed range) instructed by the operation of the selector lever 23 among the shift ranges P, R, N and D.

The shift actuator 26 is an electric actuator constructed by an electric motor and a reduction mechanism, and produces a rotational output to a rotary shaft 26a upon being fed with an electric current. A motion conversion mechanism 27 converts the rotational output produced on the rotary shaft 26a into a linear output of the spool of the manual valve 13. Therefore, the shift range of the automatic transmission 2 is changed over depending on the rotational position of the rotary shaft 26a. Therefore, the shift actuator 26 is provided with a rotational position sensor 29 for detecting the shift range (actual range) which is now being realized in the automatic transmission 2 based on the rotational position of the rotary shaft 26a.

The range control circuit 28 is an electronic circuit including a microcomputer, and has a memory 28a. The range control circuit 28 is directly connected to the range output device 25, shift actuator 26, rotational position sensor 29 and shift control circuit 18 so as to be communicable therewith. The range control circuit 28 is, further, connected to the engine control circuit 58, vehicle speed sensor 3, foot brake sensor 7, parking brake sensor 8 and accelerator sensor 9 through the in-vehicle LAN 6 to be communicable therewith. Here, the foot brake sensor 7 is provided near a brake pedal 7a in front of the driver's seat in the vehicle, and detects if the foot brake of the vehicle is in the state of on or off accompanying the operation of the pedal 7a. The parking brake sensor 8 is provided near a brake lever 8a by the side or in front of the driver's seat in the vehicle, and detects if the parking brake of the vehicle is in the state of on or off accompanying the operation of the lever 8a. Further, the accelerator sensor 9 is provided near an accelerator pedal 9a in front of the driver's seat in the vehicle, and detects if the accelerator of the vehicle is in the state of on or off accompanying the operation of the pedal 9a.

If the range instruction signal input from the range output device 25 is normal, the range control circuit 28 controls the shift actuator 26 so that the actual range represented by the signal input from the rotational position sensor 29 is brought into agreement with the instructed range represented by the range instruction signal. Therefore, in case the instructed range represented by a normal range instruction signal varies, the rotary shaft 26a rotates to a position corresponding to the instructed range after being varied, and the actual range is changed over to the instructed range. That is, the shift range change-over control of this embodiment is based on a shift-by-wire system which uses the range instruction signal as a reference signal and is realized electrically responsive to the reference signal.

Here, in case the range instruction signal has become abnormal, then the range control circuit 28 controls the shift actuator 26 based on the input signals from the shift switches 16U, 16D and the engine switch 52 and upon the input signals from the sensors 3, 7, 8 and 9 through the shift control circuit 18 and the engine control circuit 58 as will be described later in detail.

The meter device 30 includes a meter part (display part) 32, an acoustic part 34 and a meter control circuit 38. The meter part 32 is an analog meter or a digital meter provided in front of the driver's seat in the vehicle, and displays the status information, such as the speed of the vehicle, shift range of the automatic transmission 2, etc.

The acoustic part 34 shown in FIG. 1 is constructed by a speaker and provided in front of the driver's seat in the vehicle, so that it produces an acoustic output of predetermined information in the vehicle.

The meter control circuit 38 is an electronic circuit including a microcomputer and is directly connected to the meter part 32 and to the acoustic part 34 to be communicable therewith. The meter control circuit 38 is further connected to the vehicle speed sensor 3 and to the range control circuit 28 via the in-vehicle LAN 6 to be communicable therewith. The meter control circuit 38 controls the operations of the meter part 32 and the acoustic par 34 based on the input signals and the like from the vehicle speed sensor 3 and the range control circuit 28.

Figure 2B:
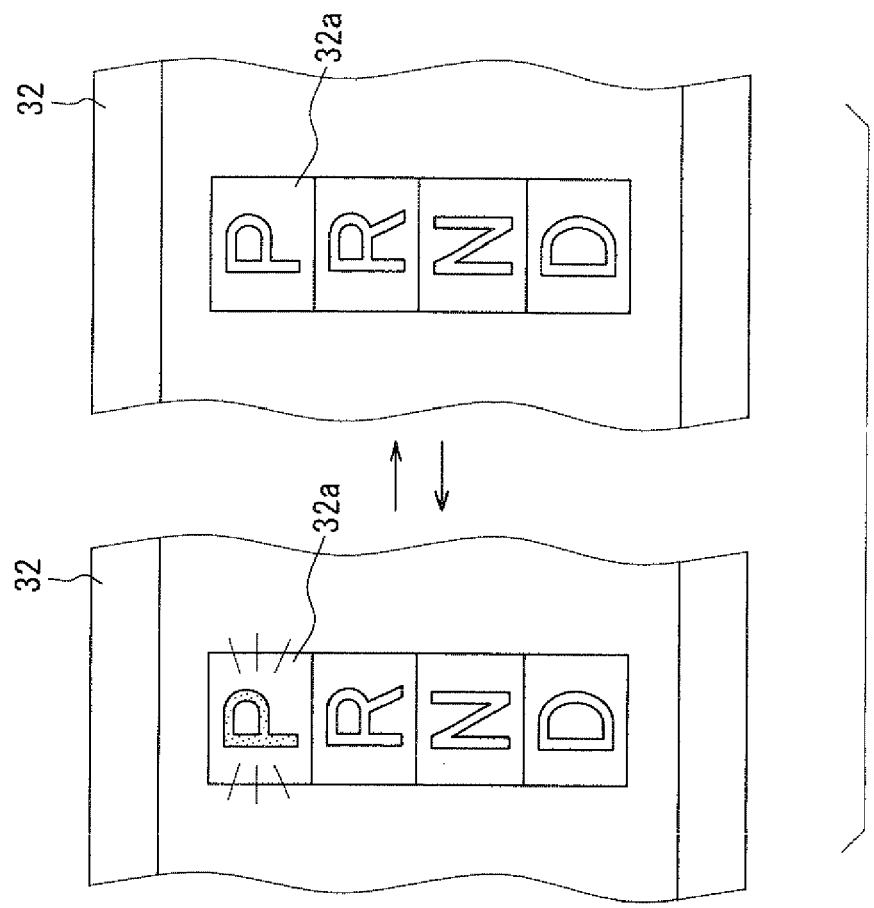
FIGS. 2A and 2B are schematic views illustrating indications of a meter part in the first embodiment of the invention.
Figure 2A:
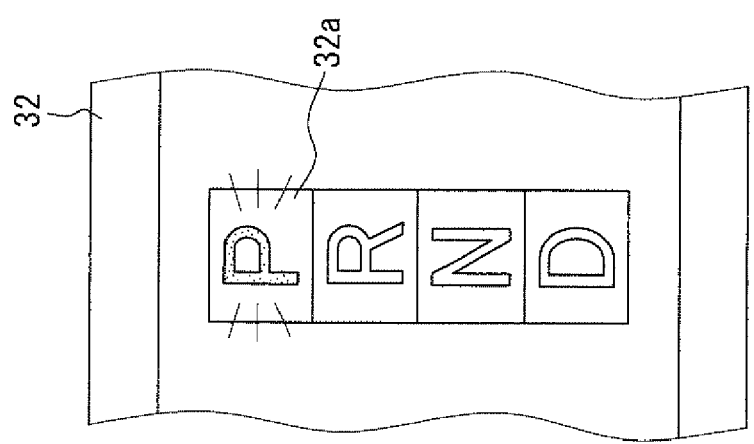

Here, a shift range which the meter control circuit 38 indicates on the meter part 32 according to the input signal from the range control circuit 28 is provided by an indicator 32a that continuously lights to indicate the actual range among the shift ranges A, R, N and D as shown in FIG. 2A provided the range instruction signal is normal. As will be described later in detail, further, if the range instruction signal is abnormal, on the other hand, the shift range is indicated by the flashing (intermittent lighting) of the indicator 32a as shown in FIG. 2B.

(Fail-Safe Control)

The range control circuit 28 is programmed to execute fail-safe control according to a computer program stored in the memory 28a. The fail-safe control commences when a switch instruction signal representing an on-instruction is input from the engine switch 52 to the range control circuit 28 through the engine control circuit 58.

At step S101, first, a range instruction signal input from the range output device 25 is monitored to check if the range instruction signal is abnormal. Specifically, at step S101 of this embodiment, the range instruction signal is determined to be normal if its duty ratio is a value representing a shift range of any one of A, R, N and D as an instruction range, and is determined to be abnormal in other cases. Here, in order to properly determine the normality or abnormality of the range instruction signal based on the duty ratio, the duty ratios are, desirably, so set as to represent the shift ranges with discrete values which are not smaller than 0% for discriminating breakage of wire or short circuit but which are not larger than 100%. Further, the shift ranges may be represented by physical quantities such as signal frequencies or signal potentials other than the duty ratios of range instruction signals. In this case, the normal or abnormal condition may be determined based on the physical quantities.

If determined to be normal at step S101, the shift actuator 26 executes the change-over control according to the above range instruction signal and the indicator 32a lights on according to the control signal input to the meter control circuit 38. If determined to be abnormal at step S101, the routine proceeds to step S102.

At step S102, the range instruction signal input from the range output apparatus 25 is invalidated. At next step S103, the control signal is input to the meter control circuit 38 to control the meter part 32 and the acoustic part 34 to thereby alarm an abnormal range instruction signal to the driver and passengers. Specifically, at step S103, the actual range indicated by the indicator 32a of the meter part 32 is switched to a flashing indication which is different from the normal continuous indication, the fact of abnormal condition is produced as a voice guidance from the acoustic part 34, and an alarm is generated to alarm abnormality. Here, the abnormal condition may be alarmed only by either switching the indication by the indicator 32a or by the voice guidance by the acoustic part 34. The abnormal condition may be alarmed by changing the color or shape of indicating the actual range by the indicator 32a from the normal ones. Furthermore, the abnormal condition may be alarmed by outputting a buzzer sound or a tune from the acoustic part 34.

Thereafter, at step S104, it is checked whether a switch instruction signal representing the off-instruction for the engine 5 is input from the engine switch 52 through the engine control circuit 58. If the determination is negative, the routine proceeds to step S105.

At step S105, a vehicle speed SPD represented by the detection signal input from the vehicle speed sensor 3 is monitored to check if the vehicle speed is lower than a preset threshold value Sth. At step S106, further, on or off of the foot brake represented by the detection signal input from the foot brake sensor 7 is monitored to check if the foot brake is in the on state. At step S107, further, on or off of the accelerator represented by the detection signal input from the accelerator sensor 9 is monitored to check if the accelerator is in the off state.

If the determination is negative at any of steps S105 to S107 indicating that the vehicle is traveling normally, the routine returns to step S104. On the other hand, if the determinations are all affirmative at steps S105 to S107, i.e., the vehicle speed is lower than the preset threshold value, the foot brake is on and the accelerator is off, then the routine proceeds to step S108. Here, it is desired that the preset threshold value Sth of the vehicle speed is a speed at which the shift range can be safely changed over, e.g., a very low value such as 10 km/h. Further, the vehicle condition in which the vehicle speed can be determined to be lower than the preset threshold value includes not only a very low-speed traveling condition of a speed of lower than the preset threshold value but also a travel-halting condition of zero speed.

At step S108 to which the routine has proceeded after the determinations are all affirmative at steps S105 to S107, the shift control circuit 18 is requested to respond. At next step S109, it is checked whether a shift instruction signal representing an up-instruction for the transmission gear ratio is input from the shift-up switch 16U through the shift control circuit 18 in response to the request at step S108. Specifically, step S109 of this embodiment so determines that the shift instruction signal of up-instruction is input if the shift instruction signals from the shift-up switch 16U continues to be on-signals discretely more than a preset number of times or continuously for longer than a preset period of time. The preset number of times and the preset period of times that serve as references for determination are, for example, 5 times and 3 seconds, respectively.

If the determination is affirmative at step S109, i.e., if the shift instruction signal representing the up-instruction is input due to the on operation of the shift-up switch 16U, the routine proceeds to step S110. At step S110, the on operation of the shift-up switch 16U is assigned to instructing the D-range; i.e., the shift instruction signal of the up-instruction is used, instead, as a range instruction signal for D-range instruction. Namely, the shift actuator 26 is so controlled that the actual range represented by the input signal from the rotational position sensor 29 becomes the D-range and, therefore, the actual range is changed over to the D-range. Here, at step S110 the control signal is input to the meter control circuit 38 accompanying the change-over of the actual range to thereby control the meter part 32 and to change the indicator 32a over to flashing indication of the D-range.

If the determination is negative at step S109, on the other hand, the routine proceeds to step S111. At step S111, it is checked whether the shift instruction signal representing the down-instruction for the transmission gear ratio is input from the shift-down switch 16D through the shift control circuit 18 in response to the request at step S108. Specifically, step S111 of this embodiment so determines that the shift instruction signal of down-instruction is input if the shift instruction signals from the shift-down switch 16D continues to be on-signals discretely more than a preset number of times or continuously for longer than a preset period of time. The preset number of times and the preset period of times that serve as references for determination are as described for the case of step S109 above.

If the determination is affirmative at step S111, i.e., if the shift instruction signal representing the down-instruction is input due to the on operation of the shift-down switch 16D, the routine proceeds to step S112. At step S112, the on operation of the shift-down switch 16D is assigned to instructing the R-range; i.e., the shift instruction signal of the down-instruction is used, instead, as the range instruction signal for R-range instruction. Namely, the shift actuator 26 is so controlled that the actual range represented by the input signal from the rotational position sensor 29 becomes the R-range and, therefore, the actual range is changed over to the R-range. Here, at step S112, the control signal is input to the meter control circuit 38 accompanying the change-over of the actual range to thereby control the meter part 32 and to change the indicator 32a over to flashing indication of the R-range.

If the determination is negative at step S111, on the other hand, the routine proceeds to step S113. At step S113, it is checked whether the output signal representing the change from the on state to the off state of the parking brake is input from the parking brake sensor 8, i.e., if the brake instruction signal for instructing the on of parking brake is input by the operation of the brake lever 8a.

If the determination is affirmative at step S113, the routine proceeds to step S114. At step S114, the on operation of the parking brake is assigned to instructing the P-range; i.e., the brake instruction signal of the on-instruction is used, instead, as the range instruction signal for P-range instruction. Namely, the shift actuator 26 is so controlled that the actual range represented by the input signal from the rotational position sensor 29 becomes the P-range and, therefore, the actual range is changed over to the P-range. Here, at step S114, the control signal is input to the meter control circuit 38 accompanying the change-over of the actual range to thereby control the meter part 32 and to change the indicator 32a over to the flashing indication of the P-range.

On the other hand, if the determination is negative at step S113 and after steps S110, S112 and S114 are executed, the routine returns to step S104 to wait for the next change-over of range.

If the determination at step S104 is affirmative, i.e., if the switch instruction signal representing the off-instruction is input from the engine switch 52, the routine proceeds to step S15. At step S115, the off operation of the engine switch 52 is assigned to instructing the P-range, and the switch instruction signal of off-instruction is used, instead, as the range instruction signal for instructing the P-range. Namely, the shift actuator 26 is so controlled that the actual range represented by the input signal from the rotational position sensor 29 becomes the P-range and, therefore, the actual range is changed over to the P-range. Thereafter, the fail-safe control ends.

According to the first embodiment described above, even if the range instruction signal becomes abnormal due to the defective range selector 22 or the defective communication between the range selector 22 and the range control circuit 28, the range shifter 16 is used instead, making it possible to instruct the D-range and the R-range that are particularly necessary for driving the vehicle. Here, upon utilizing the range shifter 16 for instructing the range, it becomes impossible to manually instruct the transmission gear ratio. However, the automatic transmission operation can be reliably continued by controlling the automatic transmission 2 by the shift control circuit 18. It is allowed to continuously travel the vehicle by automatically changing the automatic transmission to the D-range or the R-range. Further, the shift switches 16U and 16D in the range shifter 16 are operated separately from the selector lever 23 that instructs the D-range and the R-range, and are provided on the steering wheel 4 for easy operation from the standpoint of their function for instructing the shift-up and shift-down of the transmission gear ratio. Besides, the shift switches 16U and 16D are independent from each other, and are likely to be seldom operated erroneously. Therefore, even in case abnormal condition may occur, the transmission can be properly changed over to the D-range or the R-range maintaining operability comparable to that of when the selector lever 23 is operated, and the vehicle can be safely driven forward or reverse.

According to the first embodiment, further, even if an abnormal range instruction signal is produced, the P-range ran be instructed by using the brake lever 8a for the parking brake, instead, that is operated separately from the selector lever 23. Here, the parking brake is turned on at the time of parking upon operating the brake lever 8a. Therefore, the P-range can be instructed simultaneously with the parking by using the lever 8a, instead. Even in case abnormal condition occurs, therefore, the transmission can be properly changed over to the P-range maintaining operability more reliable than that of operating the selector lever 23, and the vehicle can be safely parked.

According to the first embodiment, further, the instruction of range by using the substitute elements 16, 8a is permitted only in the case of a low-speed traveling state in which the vehicle speed is lower than the preset threshold value or a travel-halting state in which the foot brake is on and the accelerator pedal is off, i.e., only in the case where the safety of the vehicle is maintained. Therefore, even in case the shift range is changed over due to erroneous operation of the substitute elements 16U, 16D, 8a, the driver is allowed to cope with the erroneous operation in a state where the safety of the vehicle is maintained to a sufficient degree.

In addition, according to the first embodiment, the P-range can be automatically instructed accompanying the off operation of the engine switch 52 that is operated separately from the selector lever 23. Therefore, the P-range is realized simultaneously with the turning off of the engine switch 52. This avoids such an occurrence that it is not allowed to start the engine 5 next time since the shift range is other than the P-range.

According to the above first embodiment, the operation of the vehicle can be continued despite abnormal range instruction signal owing to the reliable fail-safe countermeasure minimizing an increase in the cost for the fail-safe countermeasure. Here, particularly, the continued operation of the vehicle is achieved by the change-over to the shift range of D, R or P and by the automatic shift of the automatic transmission 2. In case abnormal condition has occurred, therefore, the passenger is allowed to drive the vehicle to a workshop or to a safe place to repair the vehicle.

In the first embodiment, the range selector 22 corresponds to a first operation part, and the range instruction signal output from the range output device 25 of the range selector 22 corresponds to a first instruction signal. Further, the range shifter 16 corresponds to a second operation part, the shift-up switch 16U of the range shifter 16 corresponds to an up-operation member, the shift-down switch 16D of the range shifter 16 corresponds to a down-operation member, and shift instruction signals output from the shift switches 16U, 16D of the range shifter 16 correspond to a second instruction signal. Further, the range control circuit 28 for executing step S101 corresponds to signal monitoring means, the range control circuit 28 for executing steps S101, S102 and S104 to S115 corresponds to substitute processing means, the brake lever 8a and the parking brake sensor 8 corresponds to parking brake operation part, and the engine switch 52 corresponds to a switch operation part. Further, the vehicle speed sensor 3 and the range control circuit 28 for executing step S105 correspond to speed monitoring means. The brake pedal 7a, the foot brake sensor 7 and the range control circuit 28 for executing step S106 correspond to foot brake-monitoring means. The accelerator pedal 9a, the accelerator sensor 9 and the range control circuit 28 for executing step S107 correspond to accelerator-monitoring means. The meter device 30 and the range control circuit 28 for executing steps S101 and S103 correspond to alarm means. Further, the range control circuit 28, shift actuator 26, motion conversion mechanism 27, meter device 30, pedals 7a and 9a, and sensors 3, 7 and 9 correspond to a by-wire control part.

Second Embodiment

Figure 4:
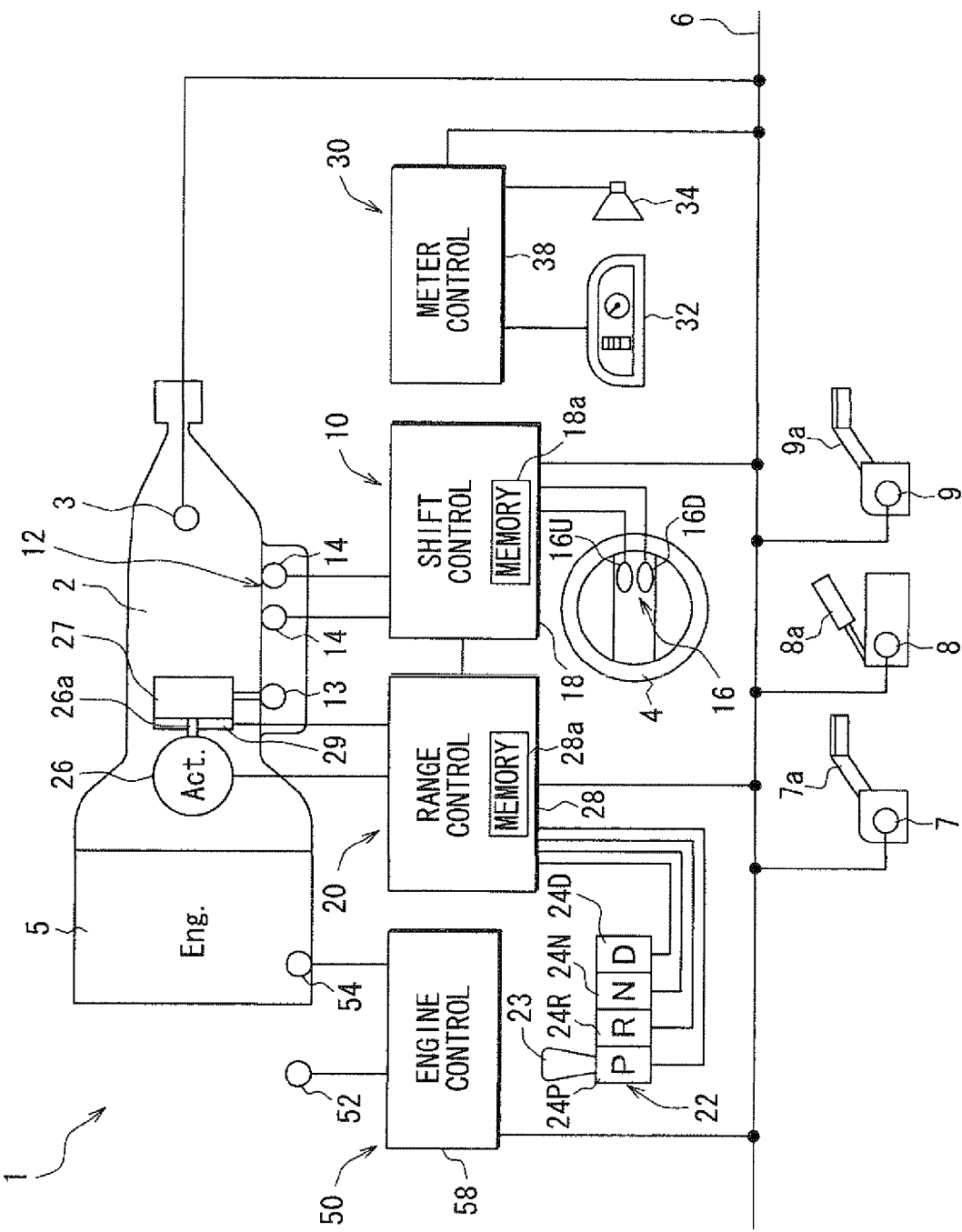
FIG. 4 is a schematic diagram illustrating a vehicle control system according to a second embodiment of the invention.

As illustrated in FIG. 4, a second embodiment is a modification of the first embodiment. In the second embodiment, the range selector 22 of the range control device 20 is not provided with the range output device 25, but the range switches 24P, 24R, 24N and 24D are directly and independently connected to the range control circuit 28. Therefore, the range control circuit 28 recognizes the signals individually input thereto from the range switches 24P, 24R, 24N and 24D as range instruction signals for instructing the shift ranges of P, R, N and D.

In the second embodiment, the fail-safe control at step S101 determines that the range instruction signal is normal if the on-signal is input from any one of the range switch 24P, 24R, 24N or 24D. In case the on-signals are simultaneously input from two or more of the range switches 24P, 24R, 24N and 24D or in case the off-signals are input from all of these range switches, the range instruction signal is determined to be abnormal.

After determined to be abnormal, the routine proceeds to step S102. Therefore, the same operation and effect as those of the first embodiment can be enjoyed despite a fault in the range switches 24P, 24R, 24N and 24D or a defective communication between these switches and the control circuit 28.

In the second embodiment, the range selector 22 corresponds to a first operation part, and a range instruction signal output from the range switch 24P, 24R, 24N or 24D of the range selector 22 corresponds to a first instruction signal.

Third Embodiment

Figure 5:
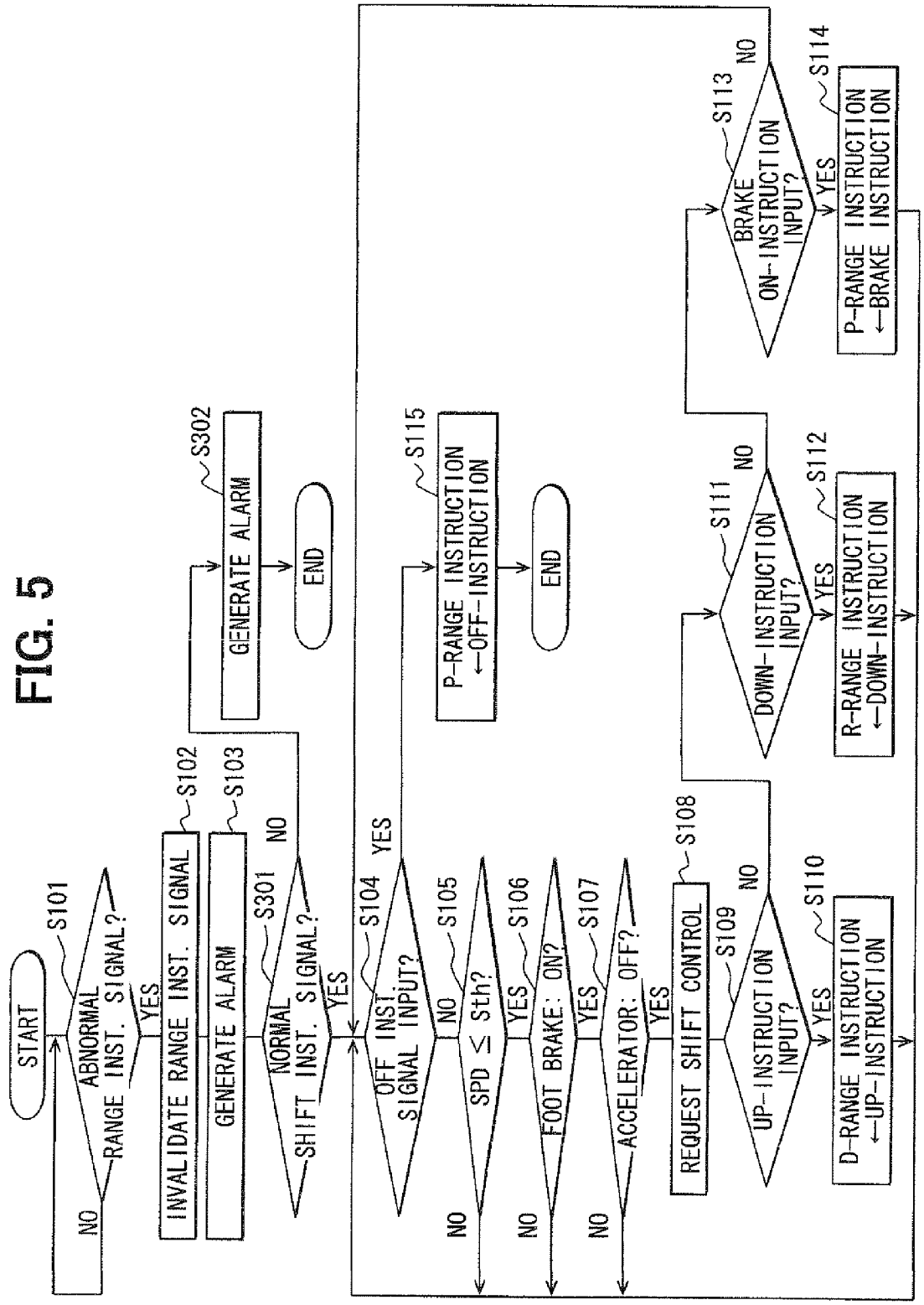
FIG. 5 is a flowchart illustrating fail-safe control in a third embodiment of the invention.

As illustrated in FIG. 5, a third embodiment is a modification of the first embodiment. In the fail-safe control of the third embodiment, the routine proceeds to step S301 after having executed step S103 that alarms abnormal condition. At step S301, the shift instruction signals input from the shift switches 16U and 16D are monitored and are checked to be normal or not. Specifically, at step S301, the shift instruction signal is determined to be normal if the on-signal is input from either one of the shift switch 16U or 16D only. On the other hand, the shift instruction signal is determined to be abnormal if the on-signals are simultaneously input from both of the shift switches 16U and 16D or if the off-signals are input from both of them.

If determination is rendered to be abnormal at step S301, the abnormal shift instruction signal is alarmed to the driver at step S302 in the similar manner as step S103 and, thereafter, the fail-safe control ends. Therefore, in case the shift instruction becomes abnormal due to a fault in the shift switches 16U, 16D or due to a defective communication between these switches and the control circuit 28, the shift range is prohibited from being changed over and safety of the vehicle is maintained primarily.

On the other hand, if the determination is rendered to be normal at step S301, it means that the shift range can be properly changed over by the shift switches 16U and 16D, and the routine proceeds to step S104 making it possible to effect a proper fail-safe countermeasure.

In the third embodiment, the range control circuit 28 for executing steps S101 and S301 corresponds to signal monitoring means.

Fourth Embodiment

Figure 6:
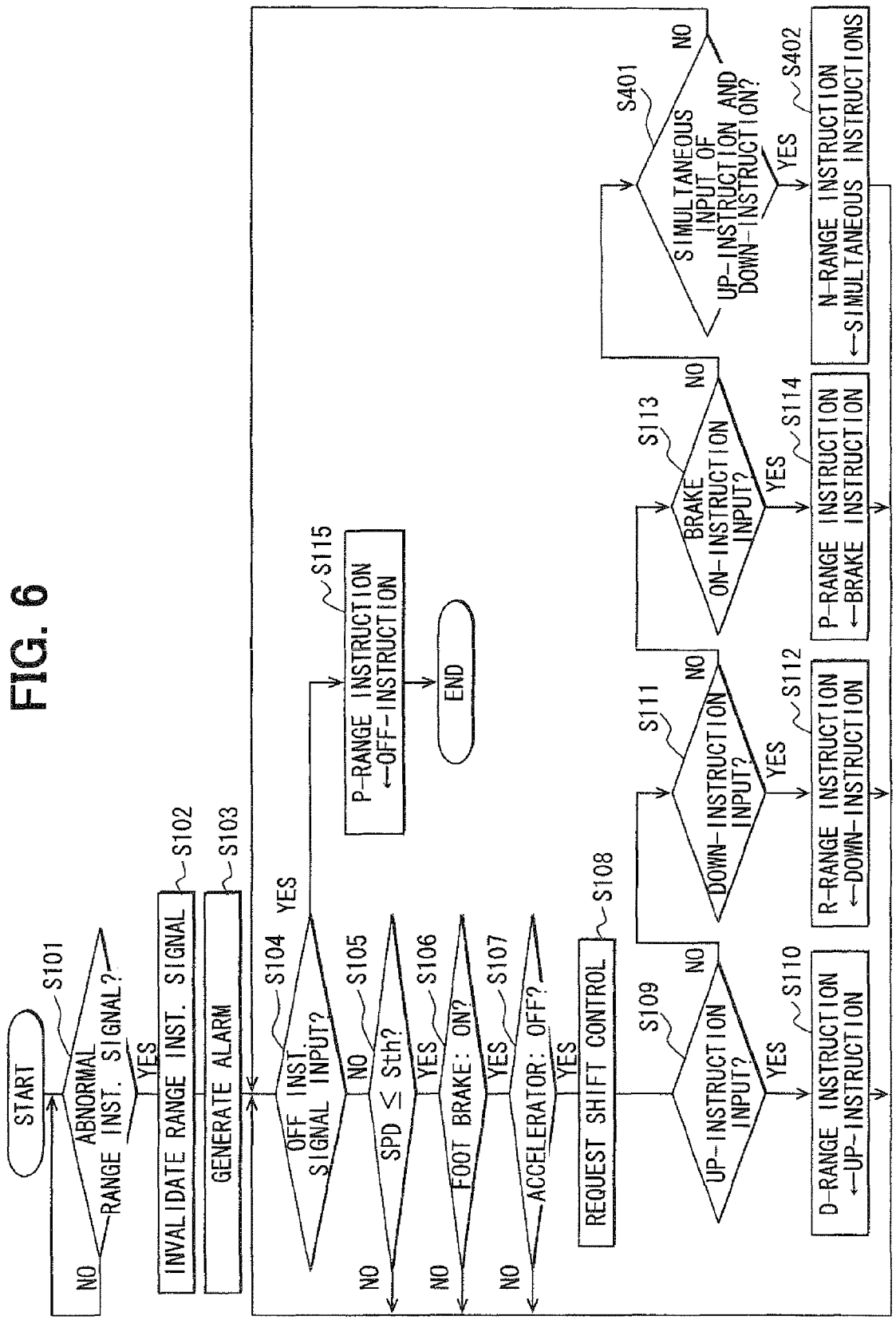
FIG. 6 is a flowchart illustrating fail-safe control in a fourth embodiment of the invention.

As illustrated in FIG. 6, a fourth embodiment is a modification of the first embodiment. In the fail-safe control of the fourth embodiment, the routine proceeds to step S401 if the determination is negative at step S113. At step S401, it is checked whether shift instruction signals of up-instruction and down-instruction are simultaneously input for longer than a predetermined period of time from the shift switches 16U and 16D in response to the request given to the shift control circuit 18 at step S108. It is checked whether the shift instruction signals of the up-instruction and the down-instruction are simultaneously input as signals representing simultaneous receipt from the shift switches 16U and 16D that have simultaneously received the on-operation. The time for simultaneously inputting the shift instruction signals of up-instruction and down-instruction that serves as a reference of determination is set to be, for example, 3 seconds.

If the determination is affirmative at step S401, the routine proceeds to step S402, where the on-operations simultaneously received by the shift switches 16U and 16D are assigned to instructing the N-range; i.e., the shift instruction signal representing the simultaneous receipt is used, instead, as the range instruction signal for instructing the N-range. Therefore, the shift actuator 26 is so controlled that the actual range represented by the input signal from the rotational position sensor 29 becomes the N-range and, therefore, the actual range is changed over to the N-range. Here, at step S402, the control signal is input to the meter control circuit 38 accompanying the change-over of the actual range to thereby control the meter part 32 and to change the indicator 32a over to the flashing indication of the N-range.

The routine returns to step S104 and waits for the next change-over of the range in case the determination is negative at step S401 and after steps S402, S110, S112 and S114 have been executed.

According to the fourth embodiment, the transmission can be safely changed over to the N-range by simultaneously operating the shift switches 16U and 16D that are provided independently of each other. Therefore, even if the range instruction signal becomes abnormal, change-over to all of the shift ranges P, R, N and D can be realized guaranteeing a sufficient degree of fail-safe countermeasure at a low cost.

In the fourth embodiment, the range control circuit 28 for executing steps S101, S102, S104 to S115, S401 and S402 corresponds to substitute processing means.

Fifth Embodiment

Figure 7:
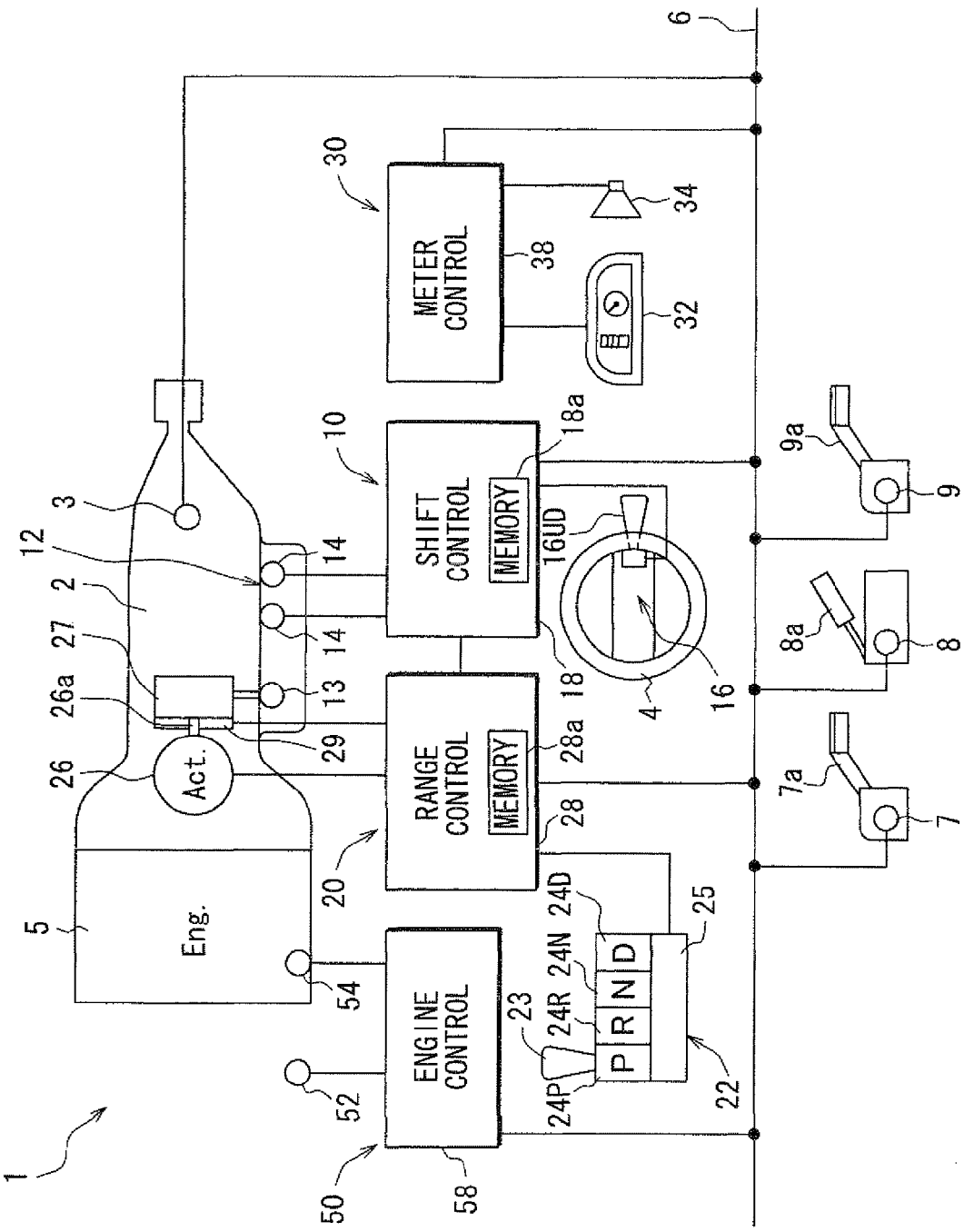
FIG. 7 is a schematic diagram illustrating a vehicle control system according to a fifth embodiment of the invention.
Figure 8A:
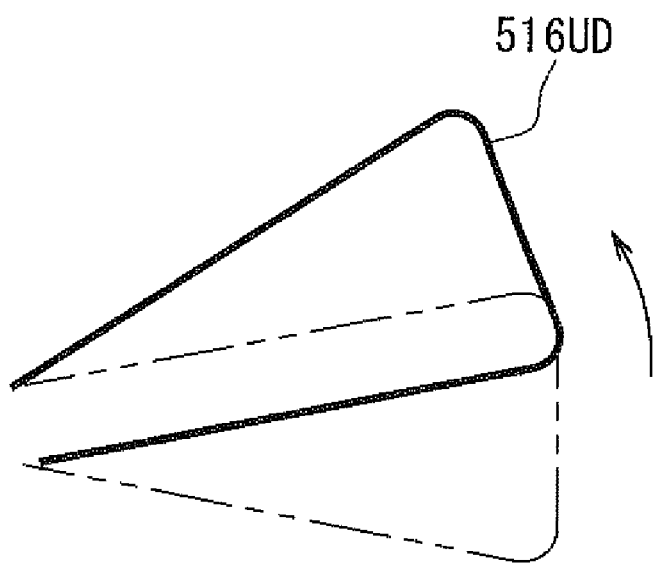
FIGS. 8A and 8B are schematic views illustrating the operation of a shift switch in the fifth embodiment of the invention.
Figure 8B:
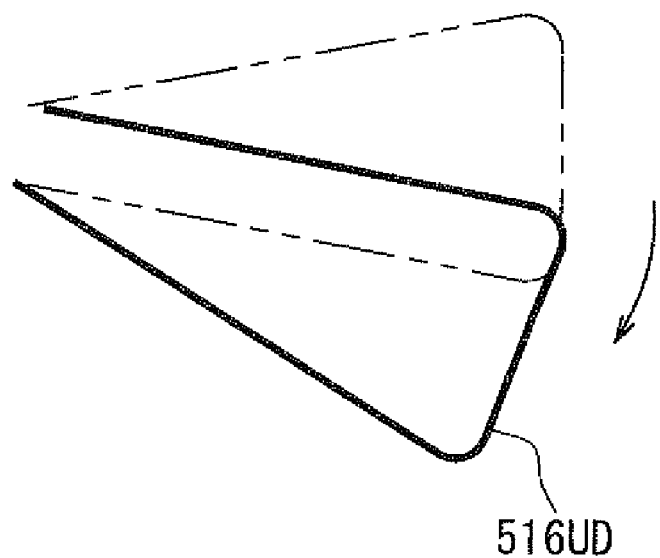

As illustrated in FIG. 7, a fifth embodiment is a modification of the fourth embodiment. In the fifth embodiment, a range shifter 16 is constructed by a shift switch 16UD. The shift switch 16UD is an arm switch that is provided on the steering wheel 4 of the vehicle and can be manually operated by the driver. The shift switch 16UD produces an on-signal on the positive potential side when it is tilted up as shown in FIG. 8A for shifting up the transmission gear ratio, produces an on-signal on the negative potential side when it is tilted down as shown in FIG. 8B for shifting down the transmission gear ratio, and produces an off-signal in other cases. Therefore, depending on its operation, the shift switch 16UD produces the shift instruction signal representing the up-instruction or the down-instruction for the transmission gear ratio.

Figure 9:
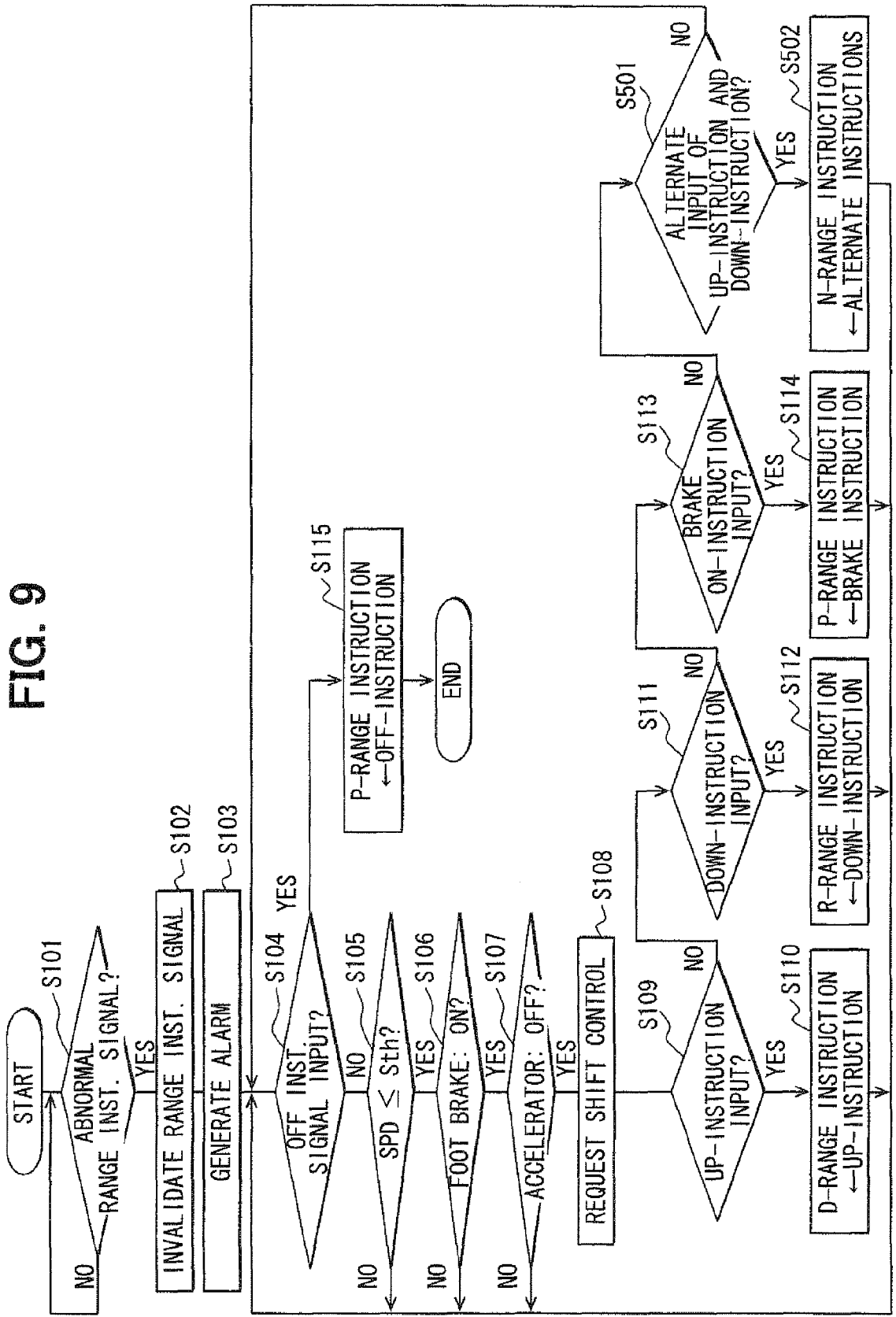
FIG. 9 is a flowchart illustrating fail-safe control according in the fifth embodiment of the invention.

In the fifth embodiment, as shown in FIG. 9, the fail-safe control at step S501 that substitutes for step S401 checks whether the shift instruction signals of up-instruction and down-instruction are alternately input each by a predetermined number of times from the shift switch 16UD responsive to a request given to the shift control circuit 18 at step S108. It is checked whether the shift instruction signals of up-instruction and down-instruction are alternately input as signals representing alternate receipts from the shift switch 16UD that has alternately received the tilt-up operation and the tilt-down operation. The number of times of inputting the shift instruction signals of up-instruction and down-instruction that serves as a reference of determination is set to be, for example, 3 times.

If the determination is affirmative at step S501, the routine proceeds to step S502 that substitutes for step S402. At step S502, the tilt-up operation and the tilt-down operation alternately received by the shift switch 16UD are assigned to instructing the N-range; i.e., the shift instruction signal representing the alternate receipt is used, instead, as the range instruction signal for instructing the N-range. Therefore, the actual range is changed over to the N-range, and the indicator 32a is changed over to the flashing indication of the N-range.

According to the fifth embodiment, even when the operation for up-instruction and the operation for down-instruction cannot be simultaneously received by the shift switch 16UD, these operations are alternately received and used to safely change the transmission over to the N-range. Therefore, the fifth embodiment, too, guarantees a sufficient degree of fail-safe countermeasure at a low cost.

In the fifth embodiment, the range shifter 16 corresponds to a second operation part, the shift instruction signal output from the shift switch 16UD of the range shifter 16 corresponds to a second instruction signal, and the range control circuit 28 for executing steps S101, S102, S104 to S115, S501 and S502 corresponds to substitute processing means.

Sixth Embodiment

Figure 10:
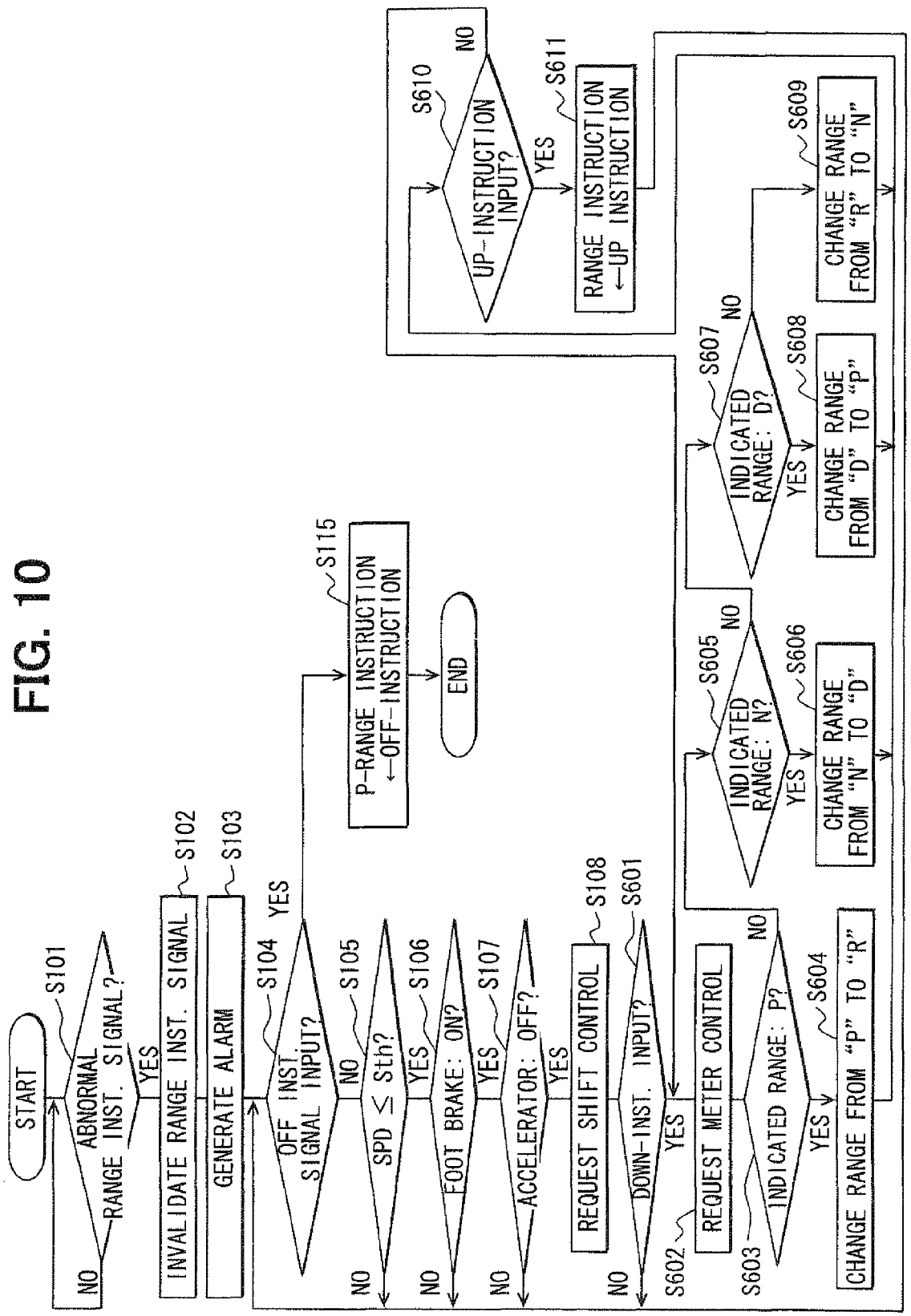
FIG. 10 is a flowchart illustrating fail-safe control in a sixth embodiment of the invention.

As illustrated in FIG. 10, a sixth embodiment is a modification of the first embodiment. In the fail-safe control of the sixth embodiment, the routine proceeds to step S601 after having executed step S108 that requests a response to the shift control circuit 18. At step S601, it is checked whether the shift instruction signal representing the down-instruction is input from the shift-down switch 16D. Specifically, if the shift instruction signal from the shift-down switch 16D is the on-signal, step S601 so determines that the shift instruction signal representing the down-instruction is input.

If the determination is negative at step S601, the routine returns to step S104. If the determination is affirmative at step S601, however, the routine proceeds to step S602. At step S602, a response is requested to the meter control circuit 38. At next step S603, further, it is checked whether the present shift range for which the indicator 32a of the meter part 32 is selectively flashing differently from that of the normal condition (selectively indicated range) is the P-range based on the input signal from the meter control circuit 38 responsive to the request of response at step S602.

If the determination is affirmative at step S603, the routine proceeds to step S604. At step S604, the control signal is input to the meter control circuit 38 to control the meter part 32, and the range selectively indicated by the indicator 32a is changed from the P-range over to the R-range. If the determination is negative at step S603, on the other hand, the routine proceeds to step S605. At step S605, it is checked whether the range selectively indicated by the indicator 32a is the N-range based on the input signal from the meter control circuit 38 responsive to the request of response at step S602.

If the determination is affirmative at step S605, the routine proceeds to step S606. At step S606, the control signal is input to the meter control circuit 38 to control the meter part 32, and the range selectively indicated by the indicator 32a is changed from the N-range over to the D-range. If the determination is negative at step S605, on the other hand, the routine proceeds to step S607. At step S607, it is checked whether the range selectively indicated by the indicator 32a is the D-range based on the input signal from the meter control circuit 38 responsive to the request of response at step S602.

If the determination is affirmative at step S607, the routine proceeds to step S608. At step S608, the control signal is input to the meter control circuit 38 to control the meter part 32, and the range selectively indicated by the indicator 32a is changed from the D-range over to the P-range. If the determination is negative at step S607, on the other hand, it is so regarded that the range selectively indicated by the indicator 32a is the remaining R-range, and the routine proceeds to step S609. At step S609, the control signal is input to the meter control circuit 38 to control the meter part 32, and the range selectively indicated by the indicator 32a is changed from the R-range over to the N-range.

After having executed steps S604, S606, S608 and S609, the routine proceeds to step S610. At step S610, it is checked whether the shift instruction signal representing the up-instruction is input from the shift-up switch 16U within a limited period of time from a moment of change-over under a condition of indicating a range that is selected upon being changed over by the immediately preceding step among steps S604, S606, S608 and S609. Specifically, at step S610, it is so determined that the shift instruction signal of up-instruction is input if shift instruction signals from the shift-up switch 16U are on-signals consecutively for more than a preset period of time. The limit period of time and the preset period of time that serve as references for determination are set to be, for example, 10 seconds and 3 seconds, respectively.

If the determination is affirmative at step S610, the routine proceeds to step S611. At step S611, the shift instruction signal of up-instruction input from the shift-up switch 16U is used, instead, as the range instruction signal for instructing a range which is selectively indicated upon being changed over by the immediately preceding step among steps S604, S606, S608 and S609. Therefore, the shift actuator 26 is so controlled that the actual range represented by the input signal from the rotational position sensor 29 comes into agreement with the range that is selectively indicated by the indicator 32a and, therefore, the actual range is changed over to the range that is now being selectively indicated. In this embodiment, therefore, after step S611 is executed, the routine returns to step S104 under a condition where the range that is in agreement with the actual range is selectively indicated by the indicator 32a.

Figure 11:
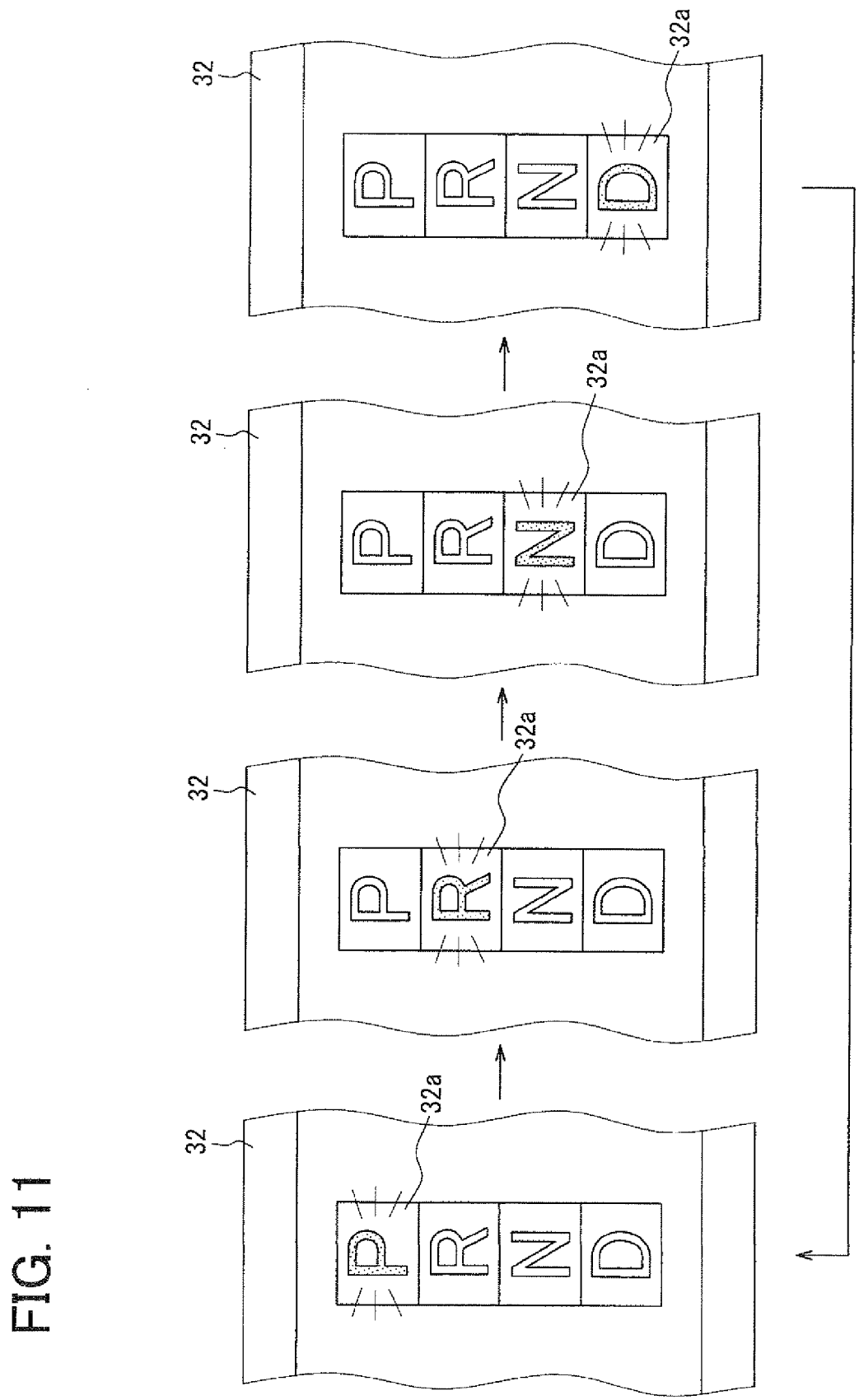
FIG. 11 is a schematic view illustrating indication of the meter part in the sixth embodiment of the invention.

If the determination is negative at step S610, on the other hand, the routine returns to step S602 where the selectively indicated range is changed over again to wait for the input of the shift instruction signal from the shift-up switch 16U. Therefore, the indication of the shift range desired by the passenger to be instructed changes over in order as shown in FIG. 11 until it is indicated by the indicator 32a. Therefore, the shift range can be instructed for all of the ranges P, R, N and D. In case the switch instruction signal representing the off-instruction for the engine 5 is input while waiting for the input of the signal from the shift-up switch 16U upon returning to step S602, the actual range is changed over to the P-range in correspondence to step S115, and the fail-safe control is forcibly terminated.

According to the sixth embodiment, even if the range instruction signal becomes abnormal, the transmission can be changed over to all of the shift ranges P, R, N and D by using the range shifter 16 and the meter part 32 guaranteeing a sufficient degree of fail-safe countermeasure at a low cost.

In the foregoing description, the range control circuit 28 for executing steps S101, S102, S108 and S601 to S609 corresponds to indication change-over means, and the range control circuit 28 for executing steps S101, S102, S104 to S107, S115, S610 and S611 correspond to substitute processing means.

Seventh Embodiment

Figure 12:
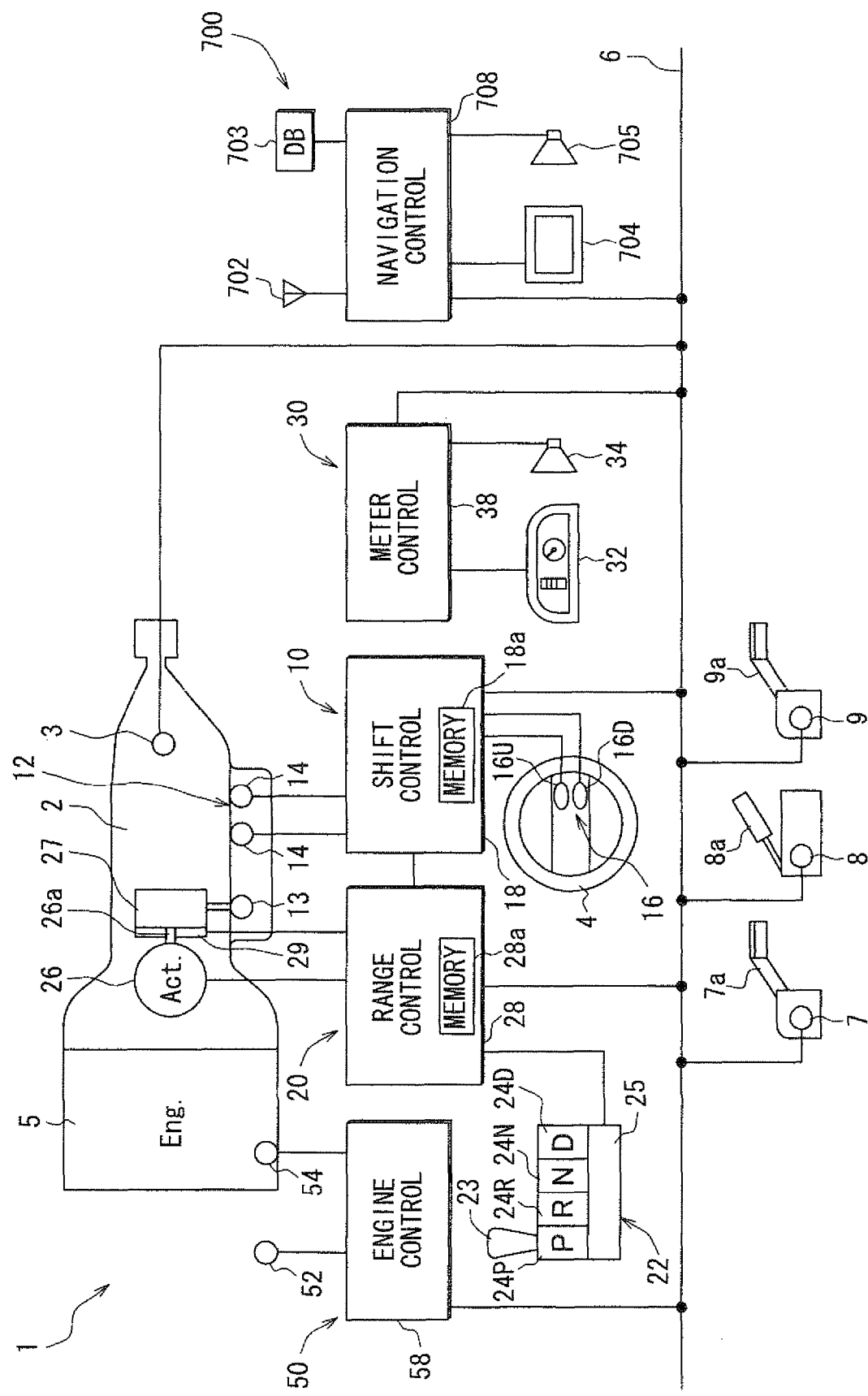
FIG. 12 is a schematic diagram illustrating a vehicle control system according to a seventh embodiment of the invention.

As illustrated in FIG. 12, a seventh embodiment is a modification of the first embodiment. In the seventh embodiment, a navigation device 700 is added.

The navigation device 700 provides additional functions for operating the vehicle and is used being installed in front of the driver's seat in the vehicle to offer a travel-assisting function. The navigation device 700 includes a position detector part 702, a database part 703, a monitor part 704, a speaker part 705 and a navigation control circuit 708.

The position detector part 702 is constructed by, for example, a receiver, a terrestrial magnetism sensor, a gyro sensor and the like sensors, and detects the present position of the vehicle based on position data signals received from GPS satellites or beacons such as of the DSRC type. The database part 703 readably stores in a predetermined storage medium the data, such as map data, character data, voice guidance data, etc. as travel-assisting data for assisting the driving of the vehicle.

The monitor part 704 displays map data and character data among the travel-assisting data. Here, the monitor part 704 of this embodiment is a touch panel type liquid crystal display (LCD) that can be operated upon touching the screen for instructing the operation of the navigation device 700, and outputs a navigation instruction signal representing the content instructed by tough operation to the navigation control circuit 708. The speaker part 705 acoustically outputs voice guidance information into the vehicle out of the travel-assisting information.

The navigation control circuit 708 is an electronic circuit including a microcomputer, and is directly connected to the parts 702 to 705 of the navigation device 700 to be communicable therewith and is, further, connected to the range control circuit 28 through the in-vehicle LAN 6 to be communicable therewith. The navigation control circuit 708 receives a detection signal representing the present position from the position detector part 702, reads, from the database part 703, the travel-assisting data best suited for driving the vehicle with the present position as a base point, and offers the data that are read out through the monitor part 704 and the speaker part 705. Here, in particular, the travel-assisting data are read out and offered according to the navigation instruction signal input through the monitor part 704. Responsive to the control signal input from the range control circuit 28, the navigation control circuit 708 controls the operations of the parts 702 to 705 of the navigation device 700.

Figure 13:
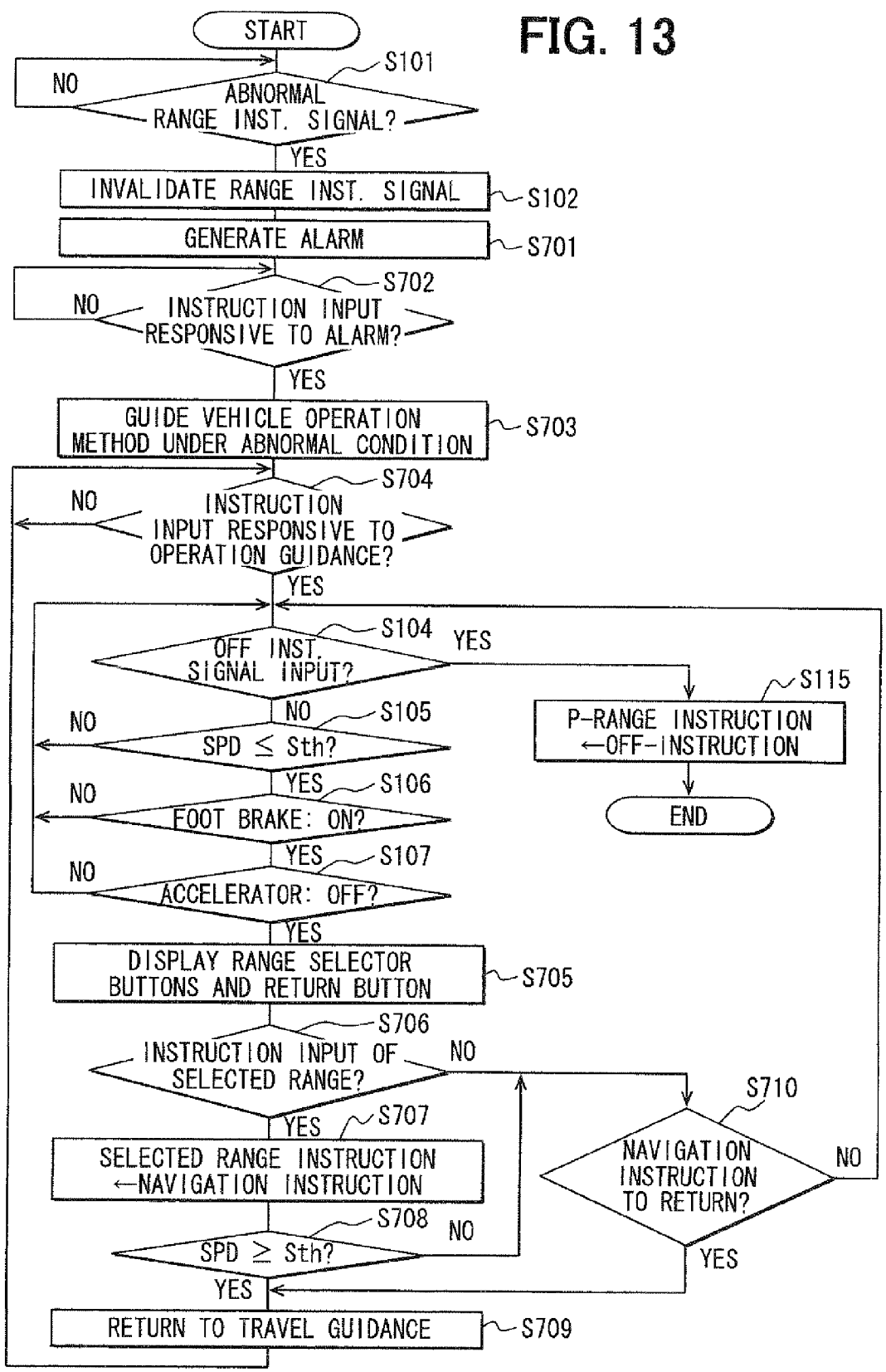
FIG. 13 is a flowchart illustrating fail-safe control in the seventh embodiment of the invention.

In the fail-safe control of the seventh embodiment, as shown in FIG. 13, step S102 is executed to invalidate the range instruction signal that has become abnormal and, therefore, the routine proceeds to step S701. At step S701, the control signal is input to the navigation control circuit 708 to control the monitor part 704 and the speaker part 705, and the alarm is generated so that the abnormal range instruction signal is alarmed to the driver.

Figure 14A:
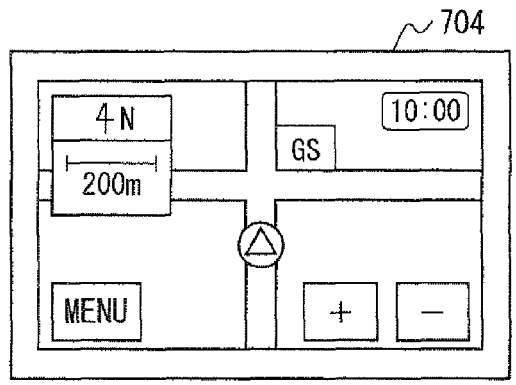
FIGS. 14A to 14E are schematic views illustrating displays on a monitor part in the seventh embodiment of the invention.
Figure 14B:
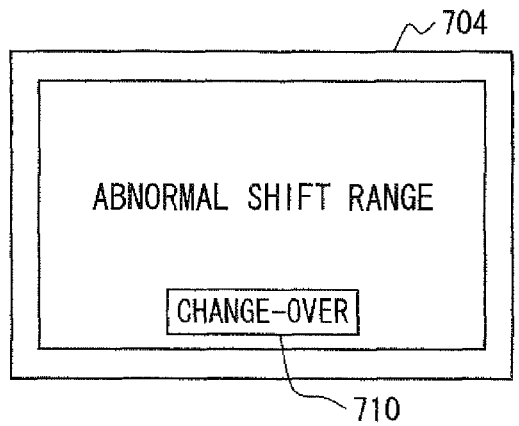

Specifically, at step S701, the display on the monitor part 704 is changed from the display of travel-assisting navigation data shown in FIG. 14A over to the display of alarming abnormal condition as shown in FIG. 14B. Here, in particular, the abnormal condition is displayed and, besides, displays a display change-over button 710 as shown in FIG. 14B for confirming the abnormal condition upon the touch operation and for changing over the display on the screen. In addition to the above display, step S701 alarms the abnormal condition by producing a voice from the speaker part 705 and requests the display change-over button 710 to be touch-operated. Here, step S701 may effect neither alarming the abnormal condition by the speaker part 705 nor requesting the operation of the display change-over button 710. The abnormal condition may be simply alarmed by outputting a buzzer sound or a tune from the speaker part 705. Further, the indicator 32a may be flashed to alarm the abnormal condition as described in the first embodiment or may be simply maintained illuminated.

Thereafter, as shown in FIG. 13, it is checked at step S702 whether the navigation instruction signal responsive to the touch-operation of the display change-over button 710 is input from the monitor part 704 through the navigation control circuit 708. That is, at step S702, it is checked whether the navigation instruction signal representing the operation of the display change-over button 710 responsive to the alarming of abnormal condition at step S701, is input from the monitor part 704. As a result, so far as the determination is negative, step S702 is executed repetitively and the request for operating the display change-over button 710 continues. If the determination is affirmative, the routine proceeds to step S703. In case the switch instruction signal representing the off-instruction for the engine 5 is input while the request is continuing for operating the display change-over button 710 due to the repetition of step S702, the actual range is changed over to the P-range in correspondence to step S115, and the fail-safe control is forcibly terminated.

Figure 14C:
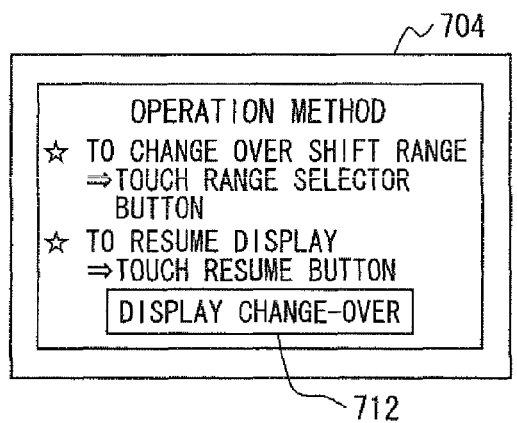

At step S703, the control signal is input to the navigation control circuit 708 to control the monitor part 704 and the speaker part 705 to guide the driver how to operate or handle the vehicle at the time of abnormal condition. Specifically, at step S703, the display on the monitor part 704 is changed over to a display that guides how to operate the monitor part 704 to instruct the shift ranges as shown in FIG. 14C. Here, in particular, the embodiment displays how to operate and, further, displays a display change-over button 712 as shown in FIG. 14C for changing over the display on the screen while confirming the method of operation upon receipt of touch-operation. In addition to the above display, step S703 guides the operation method on the monitor part 704 by voice output from the speaker part 705, and requests to touch the display change-over button 712. Here, step S703 may effect only one of guiding the operation method by the speaker part 705 and requesting the operation of the display change-over button 712.

Thereafter, as shown in FIG. 13, it is checked at step S704 whether the navigation instruction signal responsive to the touch-operation of the display change-over button 712 is input from the monitor part 704 through the navigation control circuit 708. That is, at step S704, it is checked whether the navigation instruction signal representing the operation of the display change-over button 712 responsive to the guidance of the operation method at step S703, is input from the monitor part 704. As a result, so far as the determination is negative, step S704 is executed repetitively and the request for operating the display change-over button 712 continues. If the determination is affirmative, the routine proceeds to step S104. In case the switch instruction signal representing the off-instruction for the engine 5 is input while the request is continuing for operating the display change-over button 712 due to the repetition of step S704, the actual range is changed over to the P-range in correspondence to step S115, and the fail-safe control is forcibly terminated.

Figure 14D:
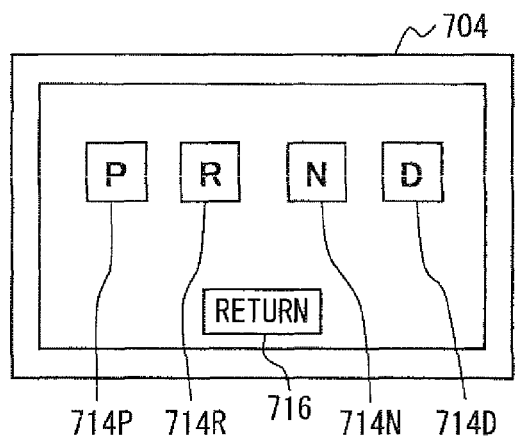

If the determination is negative at step S104 to which the routine has proceeded due to the affirmative determination at step S704 and if determinations are all affirmative at steps S105 to S107, the routine in this embodiment proceeds to step S705. At step S705, the control signal is input to the navigation control circuit 708 to control the monitor part 704, and the display on the monitor part 704 is changed over as shown in FIG. 14D. That is, at step S705 as shown in FIG. 14D, the monitor part 704 displays range selector buttons 714P, 714R, 714N and 714D corresponding to the shift ranges P, R, N and D, as well as a return button 716 for confirming the instruction to return to displaying the travel-assisting data upon receipt of touch-operation. In addition to these displays, step S705 may, further, offer voice guidance for selecting any one of the range selector buttons 714P, 714R, 714N and 714D upon controlling the speaker part 705.

Thereafter, it is checked at step S706 whether the navigation instruction signal responsive to the touch-operation of any one of the range selector buttons 714P, 714R, 714N and 174D is input from the monitor part 704 through the navigation control circuit 708. That is, at step S706, it is checked whether the navigation instruction signal representing the range selected from the shift ranges P, R, N and D by operating the monitor part 704 is input from the monitor part 704.

If the determination is affirmative at step S706, the routine proceeds to step S707. At step S707, the navigation instruction signal input from the monitor part 704 is used, instead, as the range instruction signal for instructing the range that is to be selected. Therefore, the shift actuator 26 is so controlled that the actual range represented by the input signal from the rotational position sensor 29 comes in agreement with the selected range and, accordingly, the actual range is changed over to the selected range. At step S706, the control signal is input to the meter control circuit 38 accompanying the change-over of the actual range to control the meter part 32, and the actual range after changed over is indicated by the indicator 32a.

At step S708 that follows step S707, the vehicle speed represented by the detection signal input from the vehicle speed sensor 3 is monitored tin check whether the vehicle speed SPD is higher than the preset threshold value Sth. Here, the preset threshold value of the vehicle speed that serves as a reference for determination may be the same as that of the case of step S105. If the determination is affirmative, therefore, the routine proceeds to step S709 presuming that the vehicle is in a traveling state where the probability of changing over the range is low.

Figure 14E:
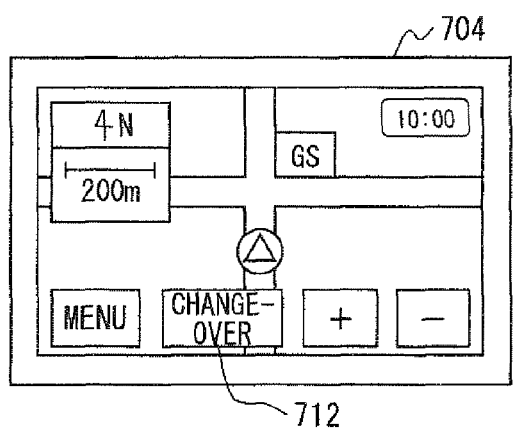

At step S709, the control signal is input to the navigation control circuit 708 to control the monitor part 704, and the display on the monitor part 704 is returned to the display of travel-assisting data. Here, the display of travel-assisting data at step S709 adds the display change-over button 712 that corresponds to step S703 as shown in FIG. 14E. After having executed step S709, therefore, the routine returns to step S704 to wait for the operation of the display change-over button 712.

If the determinations are negative at steps S706 and S708, the routine proceeds to step S710 where it is checked whether the navigation instruction signal responsive to the touch-operation of the return button 716 is input from the monitor part 704 through the navigation control circuit 708. That is, it is checked whether the navigation instruction signal for instructing the return to the display of travel-assisting data is input from the monitor part 704.

If the determination is affirmative at step S710, the routine proceeds to step S709 assuming that the passenger is hoping to return the display to the display of travel-assisting data. Namely, the display on the monitor part 704 is returned to the display of travel-assisting data, and the routine returns to step S704.

If the determination is negative at step S710, on the other hand, the routine returns to step S104 while letting the buttons 714P, 714R, 714N and 714D displayed on the monitor part 704 assuming that the driver is not hoping to return the display to the display of travel-assisting data.

According to the seventh embodiment, in case the range instruction signal becomes abnormal, the navigation device 700 is used instead to instruct all of the shift ranges P, R, N and D. Here, as the navigation device 700 instructs the range, the displayed content of travel-assisting data on the monitor part 704 loses the function for instruction. However riving the vehicle is not substantially affected. Besides, the embodiment permits the automatic transmission 2 to be either automatically shifted or manually shifted. In the navigation device 700, further, the monitor part 704 that is operated for instructing the ranges employs the touch panel and is installed in front of the driver's seat for easy operation because of its function for instructing the displayed content of travel-assisting data. Even in case an abnormal condition has occurred, therefore, the shift range can be freely and properly changed over by operating the monitor part 704, and the driving of the vehicle can be continued like when in normal condition featuring high fail-safe performance and cost performance.

According to the seventh embodiment, further, it is allowed to instruct the range by the monitor part 704 only after the passenger has determined the abnormal condition in response to the alarm. Until the range is instructed, the monitor part 704 guides the method of operation. This offers the effect for suppressing erroneous operation on the monitor part 704 to maintain safety of the vehicle.

According to the seventh embodiment, further, after the shift range is changed over by selecting any one of the range selector buttons 714P, 714R, 714N and 714D displayed on the monitor part 704, the traveling state may be assumed where the vehicle speed is higher than the preset threshold value, and the display of buttons is returned to displaying the travel-assisting data. Even when the display return button 716 is selected together with the range selector button 714P, 714R, 714N or 714D, similarly, the display is returned to displaying the travel-assisting data. Even after abnormal condition has occurred, therefore, the travel-assisting function inherent in the navigation device 700 is resumed when the vehicle is traveling in a state of small probability of changing over the range or when the passenger hopes to display the travel-assisting data again, minimizing the effect upon the travel-assisting function.

In the seventh embodiment, the navigation device 700 corresponds to a travel-assisting device, the monitor part 704 of the touch panel type corresponds to a second operation part, and the navigation instruction signal output from the monitor part 704 corresponds to a second instruction signal. Further, the range control circuit 28 that executes steps S101, S102, S705 and S708 to S710 corresponds to display control means, and the range control circuit 28 that executes steps S101, S102, S104 to S107, S115, S701, S702, S706 and S707 corresponds to substitute processing means. Further the vehicle speed sensor 3 and the range control circuit 28 that executes steps S105 and S708 correspond to speed monitoring means, the navigation device 700 and the range control circuit 28 that executes steps S101 and S701 correspond to alarm means, and the navigation device 700 and the range control circuit 28 that executes steps S101, S703 and S704 correspond to guide means. Further, the range control circuit 28, shift actuator 26, motion conversion mechanism 27, navigation device 700, pedals 7a and 9a, and sensors 3, 7 and 9 correspond to a by-wire control part.

Other Embodiments

In the first to seventh embodiments described above, only one or two steps may be executed among steps S105 to S107 of the fail-safe control. In the fail-safe control of the first to fifth embodiments, further, the shift instruction signal of up-instruction may be used instead of the range instruction signal for instructing the R-range at step S110 and the shift instruction of down-instruction may be used instead of the range instruction signal for instructing the D-range at step S112.

In the fail-safe control of the first to sixth embodiments, the response to alarm of the abnormal condition may be determined by inputting a predetermined signal such as a shift instruction signal in correspondence to step S702 of the seventh embodiment after having executed step S103 but before executing step S104. In the fail-safe control of the first to sixth embodiments, further, the method of operating the vehicle at the time of abnormal condition may be guided by the meter device 30 or the like equipped with the meter part 32 of the digital meter type, such as a liquid crystal monitor, in correspondence to step S703 of the seventh embodiment after having executed step S103 but before executing step S104.

In the fail-safe control of the second and fourth to sixth embodiments, steps S301 and S302 may be executed in correspondence to the third embodiment after having executed step S103 but before executing step S104. In the fail-safe control of the seventh embodiment, further, the navigation instruction signal may be determined to be normal or not in correspondence to steps S701 and S702 of the third embodiment after having executed step S702 but before executing step S703. In case the determination is rendered to be abnormal, an abnormal condition may be alarmed to prohibit the change-over of the shift range.

The third to seventh embodiments may employ the range selector 22 and steps S101 and S102 of the fail-safe control in correspondence to the second embodiment. At step S301 in the fail-safe control of the third embodiment, further, the brake instruction signal may be monitored and may be determined to be normal or not instead of, or in addition to, monitoring the shift instruction signal and determining it to be normal or not. In the fail-safe control of the seventh embodiment, further, the navigation instruction signal input from the monitor part 704 may be determined to be normal or not after having executed step S701 in correspondence to the third embodiment, and the routine may be shifted to step S702 only if the navigation instruction signal is determined to be normal.

At step S401 in the fail-safe control of the fourth embodiment, alternate inputs may be determined in correspondence to step S501 of the fifth embodiment instead of, or in addition to, determining the shift instruction signals of up-instruction and down-instruction simultaneously input from the shift switches 16U and 16D. In the fail-safe control of the sixth embodiment, further, input of a shift instruction signal from the shift-up switch 16U may be determined at step S601, input of a shift instruction signal from the shift-down switch 16D may be determined at step S610, and a shift instruction signal input from the shift-down switch 16D may be used, instead, as the range instruction signal at step S611.

In the seventh embodiment, a device for displaying, for example, an image outside of the vehicle on the monitor part to assist the reverse parking or the traveling at night may be employed as the travel-assisting device. In the seventh embodiment, further, a device using, for example, at least one switch provided outside the screen of the monitor part and a remote operation device as the second operation part, may be employed as the travel-assisting device.

In the fail-safe control of the seventh embodiment the display change-over button 710 may not be displayed at step S701, and step S702 may not be executed to omit the confirmation of abnormal condition. In the fail-safe control of the seventh embodiment, further, neither step S703 nor step S704 may be executed to omit the explanation of the method of operation and the confirmation of the method of operation. In the fail-safe control of the seventh embodiment, further, step S708 and subsequent step S709 may not be executed to omit the return of the display in case the vehicle speed has exceeded the preset threshold value. Further, in the fail-safe control of the seventh embodiment, the return button 716 may not be displayed at step S705, and step S710 and subsequent step S709 may not be executed to omit the return of display that follows the instruction.

Though the invention was described above by way of embodiments, it should be noted that the invention is in no way limited to the embodiments described above only but can be modified and varied in a variety of ways without departing from the gist and scope of the invention.

What is claimed is:

1. A vehicle control system for an automatic transmission of a vehicle, the vehicle control system comprising:
    a first operation part operable for issuing an instruction for shifting a range of the automatic transmission and outputting a first instruction signal representing an instruction for shifting the range;
    a second operation part provided separately from the first operation part, the second operation part being operable for issuing an instruction concerning an additional function in addition to essential functions that are essential for driving the vehicle and outputting a second instruction signal representing an instruction related to the additional function; and
    a by-wire control part for controlling a change-over of the shift range normally according to the first instruction signal input from the first operation part as a reference signal, wherein:
    the by-wire control part includes signal monitoring means for monitoring the first instruction signal input from the first operation part, and substitute processing means which uses the second instruction signal input from the second operation part as the reference signal to control the change-over of the shift range if the first instruction signal is determined to be abnormal by the signal monitoring means;
    the second operation part is configured to instruct a transmission gear ratio to the automatic transmission, the essential function of which is to automatically change the transmission gear ratio and the additional function of which is to manually change the transmission gear ratio;
    the second operation part is further configured to instruct the transmission gear ratio to be shifted up and down;
    the substitute processing means uses, if the signal monitoring means has determined that the first instruction signal is abnormal, the second instruction signal representing a shift-up as the reference signal for instructing either a forward range or a reverse range among a plurality of shift ranges, and the second instruction signal representing the shift-down as the reference signal for instructing the other one of the forward range or the reverse range; the second operation part is capable of alternately receiving an operation for instructing the shift-up and an operation for instructing the shift-down, and outputs the second instruction signal representing alternate receipt of the two operations; and
    the substitute processing means uses the second instruction signal representing the alternate receipt as the reference signal for instructing a neutral range among the plurality of shift ranges if the signal monitoring means has determined that the first instruction signal is abnormal.

2. The vehicle control system according to claim 1, wherein:
    the second operation part includes an up-operation member and a down-operation member that are operable independently of each other for instructing the shift-up and the shift-down, respectively.

3. The vehicle control system according to claim 1, further comprising:
    a parking brake operation pan that is operable separately from the first operation part to instruct a parking brake of the vehicle to turn on or off, and outputs a brake instruction signal representing an on instruction or off instruction;
    wherein the substitute processing means uses the brake instruction signal representing the on instruction of the parking brake as the reference signal for instructing a parking range among the plurality of shift ranges if the signal monitoring means has determined that the first instruction signal is abnormal.

4. The vehicle control system according to claim 1, wherein:
    the second operation part is capable of simultaneously receiving an operation for instructing the shift-up and an operation for instructing the shift-down, and outputs the second instruction signal representing simultaneous receipt of the two operations; and
    the substitute processing means uses the second instruction signal representing the simultaneous receipt as the reference signal for instructing a neutral range among the plurality of shift ranges if the signal monitoring means has determined that the first instruction signal is abnormal.

5. The vehicle control system according to claim 1, further comprising:
    a switch operation part provided separately from the first operation part to instruct an engine of the vehicle to turn off or on and output a switch instruction signal representing an on instruction or off instruction;
    wherein the substitute processing means uses the switch instruction signal representing the of instruction as the reference signal for instructing a parking range among the plurality of shift ranges if the signal monitoring means has determined that the first instruction signal is abnormal.

6. The vehicle control system according to claim 1, wherein:
    the by-wire control part has speed monitoring means for monitoring a speed of the vehicle; and
    the substitute processing means uses the second instruction signal as the reference signal, if the signal monitoring means has determined that the first instruction signal is abnormal and the speed monitoring means has determined that the speed is lower than a preset threshold value.

7. The vehicle control system according to claim 1, wherein:
    the by-wire control part has foot brake monitoring means for monitoring whether a foot brake of the vehicle is in an on state or off state; and
    the substitute processing means uses the second instruction signal as the reference signal, if the signal monitoring means has determined that the first instruction signal is abnormal and the foot brake monitoring means has determined that the foot brake is in the on state.

8. The vehicle control system according to claim 1, wherein:
    the by-wire control part has accelerator monitoring means for monitoring whether an accelerator of the vehicle is in an on state or an off state; and the substitute processing means uses the second instruction signal as the reference signal, if the signal monitoring means has determined that the first instruction signal is abnormal and the accelerator-monitoring means has determined that the accelerator is in the off state.

9. The vehicle control system according to claim 1, wherein:
the by-wire control part has alarm means for outputting an alarm indicating an abnormal condition if the signal monitoring means has determined that the first instruction signal is abnormal.

10. The vehicle control system according to claim 9, wherein:
the second operation part receives a predetermined operation and outputs the second instruction signal representing a response to the alarm indicating the abnormal condition issued by the alarm means; and
the substitute processing means uses the second instruction signal representing content of instruction different from the response as the reference signal after the second instruction signal representing the response has been input from the second operation part.

11. The vehicle control system according to claim 1, wherein:
the by-wire control part has guide means which provides instructions for operating the second operation part for instructing the shift range, if the signal monitoring means has determined that the first instruction signal is abnormal.

* * * * *